US012662168B1

(12) United States Patent
Moy et al.

(10) Patent No.: US 12,662,168 B1
(45) Date of Patent: Jun. 23, 2026

(54) VALIDATION OF TELEOPERATIONS SYSTEM FOR AUTONOMOUS VEHICLES USING INTERACTIVE VALIDATION SCENE PLAYBACK

(71) Applicant: Nuro, Inc., Mountain View, CA (US)

(72) Inventors: Nicholas Moy, San Francisco, CA (US); Sreeja Nag, San Bruno, CA (US); William Maddern, Sunnyvale, CA (US); Alan Liu, San Francisco, CA (US)

(73) Assignee: NURO, INC., Mountain View, CA (US)

( * ) Notice: Subject to any disclaimer, the term of this patent is extended or adjusted under 35 U.S.C. 154(b) by 225 days.

(21) Appl. No.: 18/155,621

(22) Filed: Jan. 17, 2023

Related U.S. Application Data

(60) Provisional application No. 63/302,822, filed on Jan. 25, 2022.

(51) Int. Cl.
  *B60W 60/00* (2020.01)
  *B60W 30/18* (2012.01)
(52) U.S. Cl.
  CPC .. *B60W 60/0059* (2020.02); *B60W 30/18109* (2013.01)
(58) Field of Classification Search
  CPC .................... B60W 60/0059; B60W 30/18109
  See application file for complete search history.

(56) References Cited

U.S. PATENT DOCUMENTS

| | | | |
|---|---|---|---|
| 10,877,476 | B2 | 12/2020 | Liu et al. |
| 11,164,479 | B1 * | 11/2021 | Madison .............. G02B 27/017 |
| 2020/0250363 | A1 * | 8/2020 | Partridge ................ G06F 30/15 |
| 2020/0385025 | A1 * | 12/2020 | Nishimura ........ B60W 60/0053 |
| 2021/0394800 | A1 * | 12/2021 | Kwak .................. G07C 5/0808 |

OTHER PUBLICATIONS

Bach, K. M., Jæger, M. G., Skov, M. B., & Thomassen, N. G. (Sep. 2008). Evaluating driver attention and driving behaviour: comparing controlled driving and simulated driving. In People and Computers XXII Culture, Creativity, Interaction. BCS Learning & Development. (Year: 2008).*

* cited by examiner

*Primary Examiner* — Stephanie T Su
(74) *Attorney, Agent, or Firm* — Edell, Shapiro & Finnan, LLC

(57) ABSTRACT

A teleoperations system enables remote teleoperations monitoring and/or control of a vehicle. The teleoperations system may be validated and a teleoperations operator of the teleoperations system may be evaluated using interactive validation scene playbacks. Scenes may be recorded during the operations of an autonomous vehicle. The scenes may be programmatically analyzed to identify those that are suitable for validation playbacks and/or to determine one or more validation requirements of the scene. During an interactive validation scene playback, a scene may be retrieved from a database and the scene, including one or more video streams of the scene, may be presented to a teleoperations operator on a teleoperations human interface system. One or more validation inputs are received during the playback and the inputs are evaluated to determine whether they satisfy the validation requirements of the scene.

19 Claims, 12 Drawing Sheets

101

701

VALIDATION OF TELEOPERATIONS SYSTEM FOR AUTONOMOUS VEHICLES USING INTERACTIVE VALIDATION SCENE PLAYBACK

PRIORITY CLAIM

This patent application claims the benefit of priority under 35 U.S.C. § 119 to U.S. Provisional Patent Application No. 63/302,822, filed Jan. 25, 2022, and entitled "Validation of Teleoperations System for Autonomous Vehicles Using Interactive Validation Scene Playback," which is incorporated herein by reference in its entirety.

TECHNICAL FIELD

The disclosure relates to providing systems for use with autonomous vehicles. More particularly, the disclosure relates to a system that facilitates the validation of a teleoperations system used with autonomous vehicles.

BACKGROUND

Teleoperation systems are often used to remotely operate vehicles, as for example when an autonomous vehicle is unable to operate safely without assistance from a remote teleoperations operator. In order for a teleoperation system to be used to safely operate a remote vehicle, the teleoperations system must be validated to ensure that the system and its operators are able to safely assume control of vehicles when they encounter safety issues while operating in an autonomous manner. There are numerous and previously unresolved challenges in validating the teleoperations system and evaluating operators of the teleoperations system, including providing realistic testing environment and assessing the human-machine combination using a set of consistent and objective requirements.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
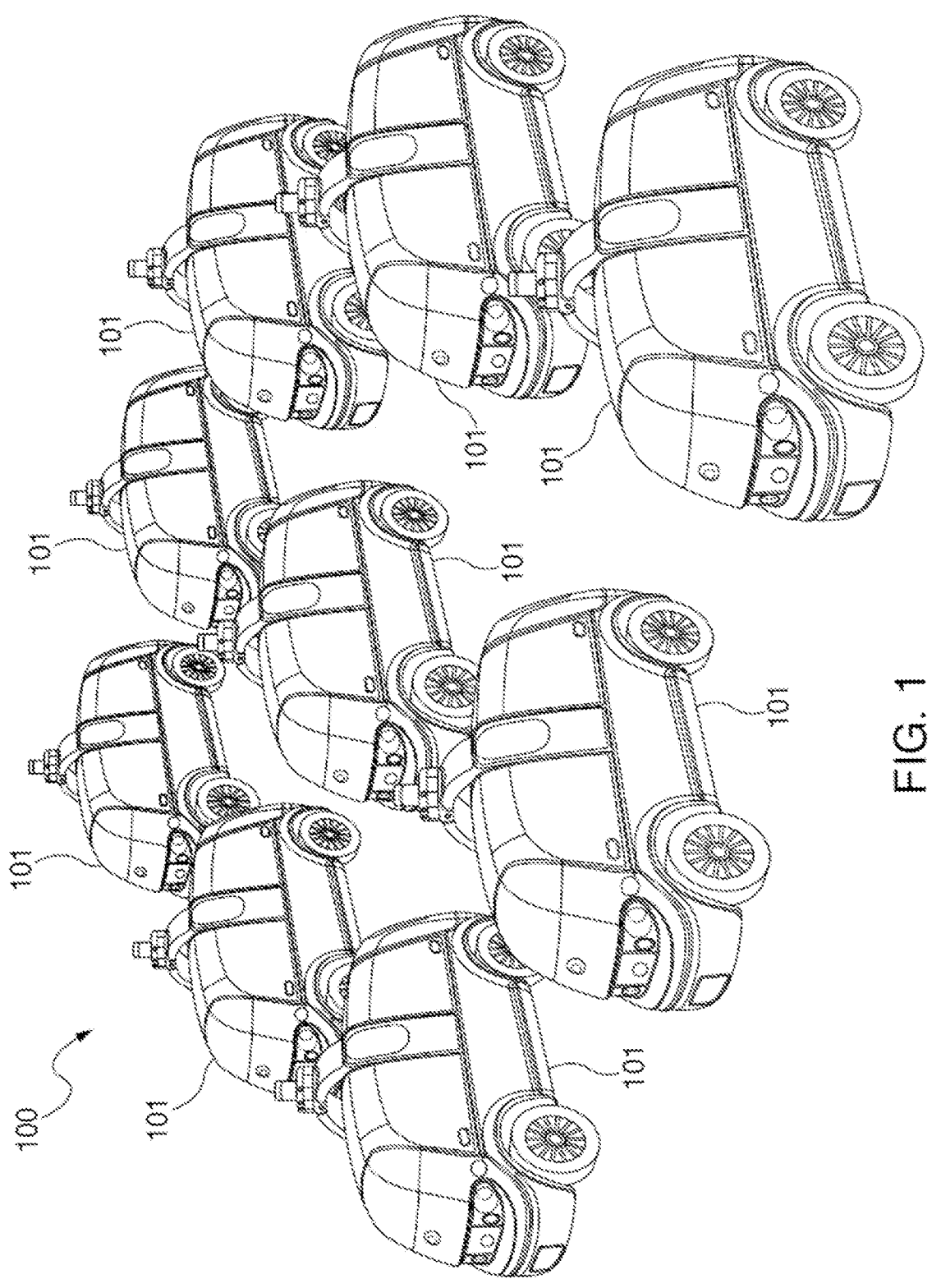
FIG. 1 is a diagrammatic representation of an autonomous vehicle fleet in accordance with an embodiment.

In one embodiment, a teleoperations system enables remote teleoperations control of an autonomous vehicle. The teleoperations system may be validated and a teleoperations operator of the teleoperations system may be evaluated using interactive validation scene playbacks. Scenes may be recorded during the operations of an autonomous vehicle. The scenes may be programmatically analyzed to identify those that are suitable for validation playbacks and/or to determine one or more validation requirements of the scene. During an interactive validation scene playback, a scene may be retrieved from a database and the scene, including one or more video streams of the scene, may be presented to a teleoperations operator on a teleoperations human interface system. One or more validation inputs are received during the playback and the inputs are evaluated to determine whether they satisfy the validation requirements of the scene.

In another embodiment, a computer-implemented method comprises retrieving a first driving scene, wherein the first driving scene corresponds to a real-world driving scenario captured by a first vehicle; presenting a playback of the first driving scene for an operator, the playback of the first driving scene being presented by a teleoperations console to simulate the operator remotely monitoring the first vehicle using the teleoperations console during the real-world driving scenario; during presentation of the playback of the first driving scene by the teleoperations console, monitoring one or more controls on the teleoperations console; determining, based on monitoring one or more controls on the teleoperations console, a first evaluation outcome for the operator for the first driving scene; and based at least in part on the first evaluation outcome for the operator for the first driving scene, certifying the operator for performing teleoperations functions for a fleet of vehicles.

In yet another embodiment, a computer-implemented method comprises receiving, from a first vehicle, a set of data captured by the first vehicle during a real-world driving scenario of the first vehicle; generating a first driving scene based on the set of data; presenting playbacks of the first driving scene for a plurality of operators, each of the playbacks of the first driving scene: (i) being presented on a respective teleoperations console for a respective operator of the plurality of operators to simulate the respective operator remotely monitoring the first vehicle during the real-world driving scenario of the first vehicle, and (ii) generating a respective evaluation outcome for the respective operator for the first driving scene; and validating a teleoperations system based at least in part on an aggregate measure of evaluation outcomes for the first driving scene generated for the plurality of operators.

In a further embodiment, a teleoperations console comprises one or more processors; one or more displays for presenting one or more live video feeds from a first vehicle being remotely monitored via the teleoperations console; one or more controls for receiving inputs to generate remote commands to the first vehicle being remotely monitored by the teleoperations console; and one or more memory resources storing instructions that, when executed by the one or more processors of the teleoperations console, cause the teleoperations console to operate in a validation mode. In the validation mode, the teleoperations console presents, on the one or more displays, a playback of a driving scene corresponding to a real-world driving scenario captured by a second vehicle, the playback of the driving scene being presented by the teleoperations console to simulate an operator remotely monitoring the second vehicle using the teleoperations console during the real-world driving scenario; during presentation of the playback of the driving scene by the teleoperations console, monitors the one or more controls on the teleoperations console; and determines, based on monitoring the one or more controls on the teleoperations console, an evaluation outcome for the operator for the driving scene.

Description

For vehicles or robotic devices (collectively referred to herein as vehicles) that are capable of driving and operating autonomously on public roads and highways, safety is of paramount importance. Autonomy systems onboard such vehicles are capable of analyzing the surrounding environments and determine safe routes for the vehicles to travel to their intended destinations. In particular, the autonomy systems may utilize artificial intelligence and machine learning to process sensor data pertaining to the surrounding environments to identify traversable road surfaces. However, such autonomy systems may in rare instances experience hardware and/or software errors or faults or encounter situations that are unable to be processed by the autonomy systems. Teleoperations systems, or systems that may be used to allow for the remote control of a machine such as a vehicle, may be used in many situations to increase the likelihood that the vehicle may operate at a relatively high level of safety. For instance, a teleoperations system may enable a remote teleoperations operator to take control of or issue commands to a vehicle in particular scenarios, such as where the autonomy system of the vehicle is unable to operate above a confidence threshold.

During the remote operation of a vehicle by an operator using a teleoperations system, a display feed may be provided to the operator that depicts the environment of the vehicle. The display feed may be provided on a teleoperations human interface system that comprises one or more displays and one or more control input mechanisms. The display feed may include, for example, a video feed generated based on live data captured by one or more cameras onboard the vehicle. The display feed may further include contextual information including, for example, vehicle data such as speed, direction, heading, and various systems information regarding the vehicle. The display feed may further include supplemental information regarding objects displayed in the video feed. The supplemental information may effectively clarify what is in the video feed, as it may be difficult to discern which objects in the feed are moving and/or have a significant potential to adversely affect the operations of a vehicle. The supplemental information may be provided based on data generated by onboard sensors such as LiDARs, radars, and/or ultrasonic sensors. The supplemental information may also be generated using machine-learning algorithms that may categorize or identify objects based on available information including camera and other sensor data. In one embodiment, display feeds may identify objects that may be obstacles using visual indicators such as overlays, and may provide contextual information relating to such obstacles. An overlay may be arranged to identify a type of obstacle, while contextual information may indicate whether the obstacle is moving and/or a direction of movement of the obstacle. The use of overlays and/or contextual information may allow a remote operator to readily identify obstacles in a feed. The ability to efficiently identify obstacles along a path of a vehicle may increase the likelihood that a remote operator may safely operate the vehicle, or safely take over the operation of the vehicle in the event that the presence of the obstacle substantially necessitates a takeover of control of the vehicle.

While the use of a teleoperations system to take control of or issue commands to a vehicle may significantly improve safety performance of the vehicle, a teleoperations operator may need to be objectively evaluated to determine whether the teleoperations operator is capable of safely operating as a teleoperations operator for one or more autonomous vehicles. In addition, various aspects of the teleoperations system, as operated by a population of teleoperations operators, may need to be validated against safety, performance, and other requirements.

Embodiments described herein provide for an objective process and system to validate both the teleoperations system as well as to evaluate individual operators using interactive validation scene playbacks. As described herein, a scene (or driving scene) may refer to captured snapshots of the environment and operating conditions of a vehicle. In particular, a scene may correspond to a real-world driving scenario captured by a vehicle. During a playback or replay of a scene for validating the teleoperations system, the same information may be displayed and provided for a teleoperations operator as is displayed and provided for during actual teleoperations control of a vehicle. In other words, a validation playback of a recorded scene may be provided, on a teleoperations console (e.g., a teleoperations human interface system), in an identical manner as providing a display feed during actual teleoperations control of a vehicle. In this manner, the playback of a scene being presented for an operator on a teleoperations console may simulate the operator remotely monitoring the vehicle using the teleoperations console during the real-world driving scenario of the driving scene. A particular captured scene may include data captured by sensors of the autonomous vehicle that describe the vehicle's environment including, for example, audio data, visual data (e.g., images and/or video feeds), radar data, LiDAR data, ultrasonic sensor data, location data (e.g., GPS data) etc. The captured scene may also include data pertaining to the operating conditions of various systems of the autonomous vehicle such as the speed, direction, status of its systems (e.g., status of a primary autonomy system, etc.), and the like. A captured scene may also include contextual information such as data relating to weather conditions of the surroundings of the vehicle, etc. A captured scene may be of any temporal duration, such as thirty seconds, one minute, or five minutes. Furthermore, while a scene may correspond to a recorded portion of a display feed provided during teleoperations control of a vehicle, scenes may be recorded while the vehicle is not under teleoperations control (e.g., while operating autonomously). In some embodiments, scenes are continuously recorded as the vehicle is operating. And scenes may be used for purposes other than validation of the teleoperations system including, for example, for training and improving the algorithms of the autonomy systems of the vehicles.

In addition, or as an alternative, a scene may be a simulated driving scenario of a virtual vehicle. In particular, in contrast to scenes generated using real-world driving data, simulated scenes may be synthetically created. In other words, synthetic or virtual scenes may include graphically rendered objects, agents, and/or environments rather than real-world recordings of actual driving scenarios of vehicles. Similar to scenes generated using real-world data captured by vehicles, synthetic or virtual scenes may be presented on teleoperations consoles for training of operators, evaluation of operators, or validation of the teleoperations system. For example, a synthetic or virtual scene may be presented on a teleoperations console to simulate the operator remotely controlling a virtual vehicle using the teleoperations console during the simulated driving scenario of the synthetic or virtual scene. During presentation of the synthetic or virtual scene, the rendering presented on displays of the teleoperations console may be dynamically modified based on inputs provided by the operator via one or more controls on the teleoperations console.

In one embodiment, for evaluating an operator and/or validating the teleoperations system, real-world scenes and synthetic or virtual scenes may be used. For instance, playbacks of the real-world scenes may be used to evaluate the operator remotely monitoring vehicles (e.g., while the vehicles operate autonomously or in autonomy modes) using teleoperations. Such playbacks may also support validating the teleoperations system in providing remote monitoring functionalities for operators. The operator may be evaluated (and/or the teleoperations system may be validated) based on whether the operator intervenes (e.g., by providing an input to cause the vehicle to exit autonomy or to perform an emergency stop) under the appropriate circumstances during the presentations of the playbacks of the real-world scenes. Playbacks of the synthetic or simulated scenes may be used to evaluate the operator in remotely controlling vehicles under various circumstances (e.g., pulling into traffic, performing a stop, remotely driving the vehicle, etc.). For instance, in actual teleoperations operation of a vehicle, an operator may be expected to (i) remotely monitor the vehicle and intervene to cause the vehicle to stop or exit autonomy mode under certain circumstances and (ii) subsequently, remotely control the vehicle to either drive the vehicle or stop the vehicle at a safe location. By presenting scene playbacks using both real-world driving scenes and virtual driving scenes, the present disclosure enables both aspects of teleoperations functions to be evaluated and/or validated.

According to embodiments, scenes may be recorded during actual operations of a fleet of vehicles. The scenes may be analyzed to identify ones that are suitable for validation playback. A scene that is suitable for validation playback may be analyzed and one or more validation requirements may be determined for the scene. The validation requirements may correspond to one or more requirements associated with a validation input that is to be provided by an operator during the interactive validation scene playback. The scene may be stored in a database of validation scenes that may be used for validation of the teleoperations system.

According to embodiments, during a particular interactive validation scene playback, a scene that has previously been identified as suitable for validation playback may be retrieved from the database of validation scenes. Furthermore, the previously determined validation requirements may also be retrieved. The scene may be presented on a teleoperations human interface system to a teleoperations operator. A validation input may be received from the teleoperations operator via the teleoperations human interface system. A determination is made as to whether the validation input(s) satisfies the validation requirements associated with the scene. If the validation input satisfies the validation requirements, the validation playback of the scene may be deemed to have been successfully completed. On the other hand, if the validation input fails to satisfy the validation requirements, the validation playback of the scene may be deemed to have failed.

As used herein, evaluations or evaluation processes are generally meant to describe the evaluation of a particular teleoperations operator using, for example, one or more interactive validation scene playbacks. Furthermore, as used herein, validations or validation processes are generally meant to describe the validation of the teleoperations system as a whole, for instance, by performing a plurality of interactive validation scene playbacks for a plurality of teleoperations operators. However, the terms evaluation or validation may also be used interchangeably.

In one aspect, a teleoperations operator may be evaluated by performing a series of interactive validation scene playbacks. A cumulative measure of the teleoperations operator's performance over the series of interactive validation scene playbacks (e.g., a percentage measure of the teleoperations operator's passing rate, etc.) may be used to determine whether the teleoperations operator is suitable for remote teleoperations control of autonomous vehicles. In another aspect, interactive validation scene playbacks may be performed to validate the performance of the teleoperations system as a whole (e.g., validating the performance of the human-machine combination of a population of teleoperations operators using the teleoperations system to remote take control of vehicles). For instance, interactive scene validation playbacks may be used to validate the performance of the population of teleoperations operators utilizing the teleoperations system to remotely issue commands or input to vehicles (e.g., emergency stop commands, brake commands, steering input) under the specific scenarios presented during the interactive validation scene playbacks.

Vehicles within a fleet may be monitored and controlled, as appropriate, remotely by remote operators using a remote control and/or a teleoperation system. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
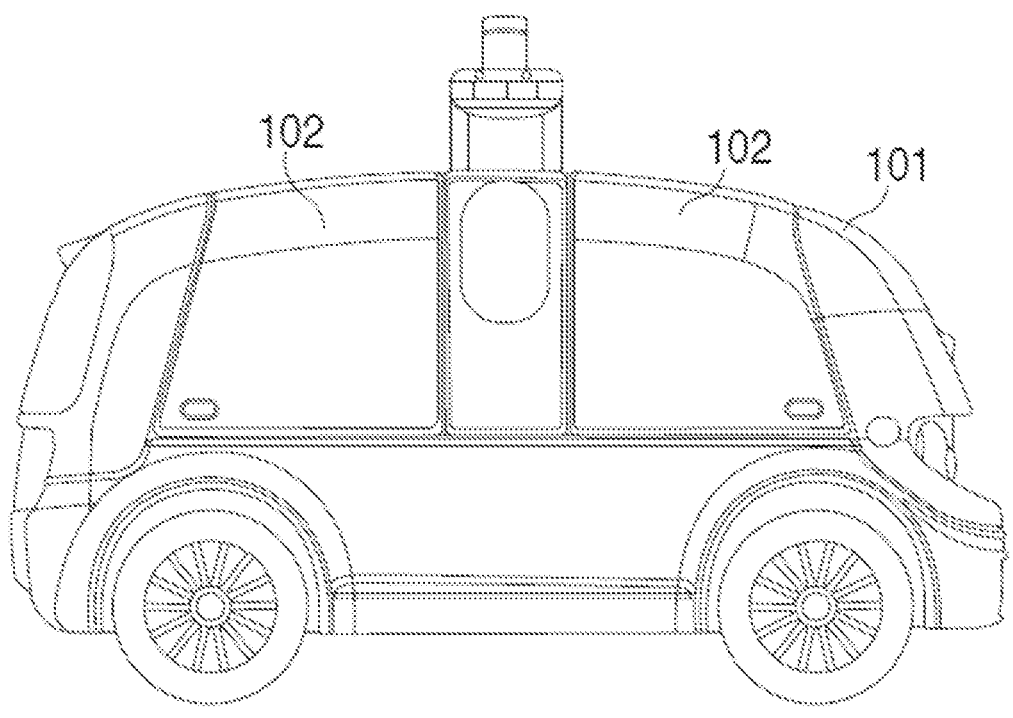
FIG. 2 is a diagrammatic representation of a side of an autonomous vehicle in accordance with an embodiment

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
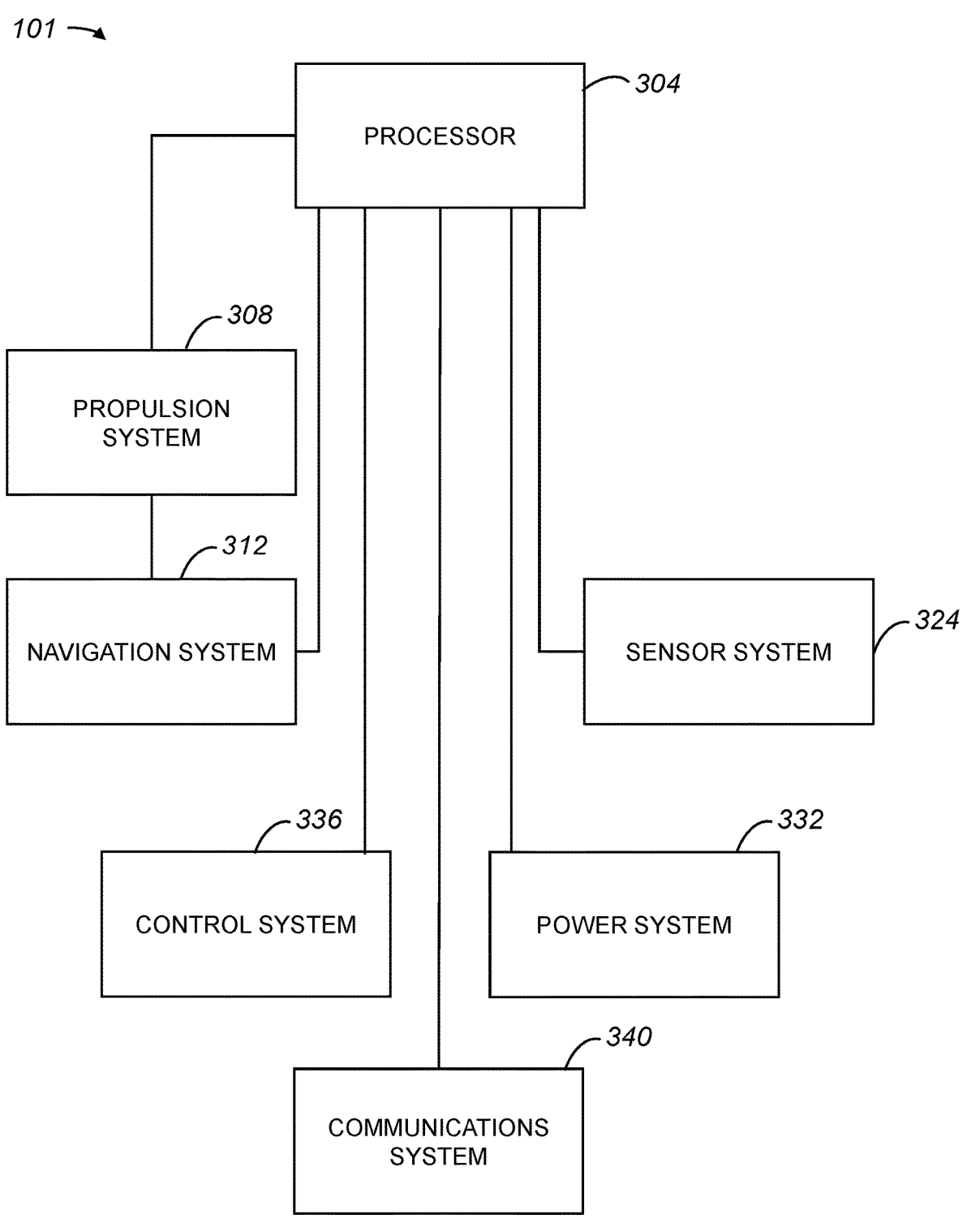
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels. Data collected by sensor system 324 may be used by a perception system associated with navigation system 312 to determine or to otherwise understand an environment around autonomous vehicle 101.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336. Components of propulsion system 308, navigation system 312, sensor system 324, power system 332, and control system 336 may effectively form a perception system that may create a model of the environment around autonomous vehicle 101 to facilitate autonomous or semi-autonomous driving.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 324 may be processed such that the environment around autonomous vehicle 101 may effectively be perceived.

Figure 4:
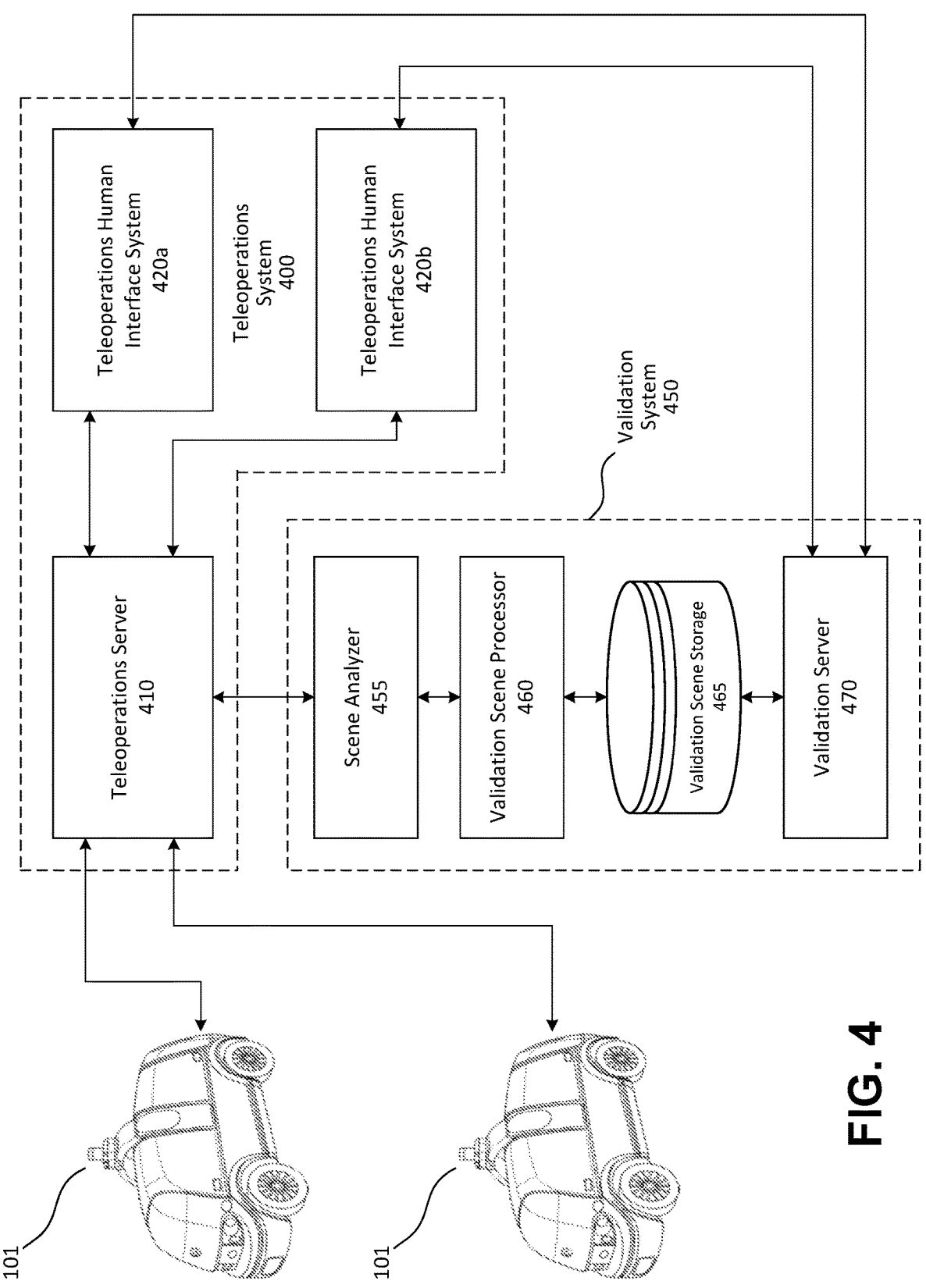
FIG. 4 is a block diagram representation of a teleoperations validation system in communication with a teleoperations system, in accordance with an embodiment.

FIG. 4 is a block diagram representation of a teleoperations validation system in communication with a teleoperations system, in accordance with an embodiment. As illustrated in FIG. 4, a fleet of autonomous vehicles 101 may communicate with a teleoperations system 400 to enable teleoperations monitoring and/or control of the autonomous vehicles 101. The teleoperations system may comprise a teleoperations server 410 and one or more teleoperations human interface systems 420a and 420b. Furthermore, a validation system 450 may communicate with the teleoperations system 400 to identify scenes for validation purposes and to enable interactive validation scene playback on the teleoperations human interface systems 420a and 420b.

A vehicle 101 may include sensors such as cameras, LiDARs, radars, ultrasonic sensors, and the like to sense the environment of the vehicle. Data captured by these sensors enable the vehicle 101 to autonomously navigate its environment to travel to its intended destination. In addition, at least some of the sensor data may be relayed to the teleoperations server 410 to facilitate teleoperations operations. A teleoperations operator, by interacting with the teleoperations human interface systems 420a and 420b, may remotely monitor and/or control the vehicles 101 as they operate. Each of teleoperations human interface system 420a and 420b may be operated by a corresponding teleoperations operator. And each teleoperations operator may monitor a plurality of vehicles 101. To that end, the teleoperations human interface systems, such as 420a or 420b, may include visual interfaces to enable the teleoperations operator to view the environment (e.g., front view, side view, rear view) of one or more vehicle(s) by way of live video feeds captured by cameras onboard the vehicles 101 that are presented on the visual interfaces of the teleoperations human interface systems. Information relating to captured snapshots of the environment and operating conditions of the autonomous vehicles 101, including information presented on the teleoperations human interface systems 420a and 420b, may be recorded as scenes by the teleoperations server 410. Scenes may be recorded for purposes such as training and validating the autonomy systems of the vehicles 101 and validating the teleoperations system 400.

A teleoperations operator may issue a command to a vehicle 101 or may assume teleoperations control of the vehicle 101 in the event that the vehicle 101 experiences a fault (e.g., a fault in the vehicle's autonomy system) or if the operator sees the need to intervene in the operation of the vehicle. The teleoperations human interfaces 420a and 420b may include controls to enable the operators to assume teleoperations control of the vehicles and/or to issue commands to the vehicles 101. For instance, a teleoperations human interface system such as 420a or 420b may include a steering wheel and accelerator and brake pedals to enable the teleoperations operator to assume teleoperations control of one of the vehicles 101 the operator monitors. In addition, or as an alternative, the teleoperations human interface system such as 420a or 420b may include an input to cause one of the vehicles 101 the operator monitors to perform an operation such as performing an emergency stop or to pull over to the side of the road. Once triggered in response to the input, the operation may be performed automatically or autonomously by the vehicle 101 without the operator to assume full teleoperations control of the vehicle 101. For instance, the vehicle 101 may perform an autonomous pull over operation based on data captured by sensors of the vehicle (e.g., based on camera data, LiDAR data, radar data, and the like to safely perform an autonomous pull over maneuver).

According to embodiments, the validation system 450 may comprise a scene analyzer 455, a validation scene processor 460, a validation scene storage 465, and a validation server 470. The scene analyzer 455 may analyze the scenes recorded by the teleoperations server 410 to identify those that are suitable for validation of the teleoperations system 400. For instance, the scene analyzer 455 may identify a scene for validation based on the status or health of the vehicle's autonomy system during the scene. As an example, a scene may be identified for teleoperations validation purposes based on the primary autonomy system of the vehicle entering a failure mode during the scene. In addition, or as an alternative, the scene analyzer 455 may identify a scene for teleoperations validation based on whether a teleoperations operator intervene to issue commands to or take control of the vehicle during the scene. Furthermore, the scene analyzer 455 may identify a scene for teleoperations validation based on recognizing specific situations or objects within the scene, such as identifying objects that indicate road construction, identifying a scenario within the scene corresponding to an unprotected turn, determining that the vehicle was within a threshold distance of impacting another vehicle, pedestrian, or cyclist, and the like.

In certain implementations, the scene analyzer 455 may programmatically analyze a scene to score the scene in terms of a breadth (e.g., types of situations, scenarios, or objects in the scene) and a depth (e.g., number of each of type of situations, scenarios, or objects in the scene). For example, breadth may refer to a general presence of objects such as vehicles in a scene, while depth may refer to a number of vehicles in the scene and, in some instances, the activities that the vehicles are engaged in. The scene analyzer 455 may determine the score of the scene using object recognition and machine-learning algorithms. The scene analyzer 455 may identify scenes that score above a threshold value as scenes to be used for validating the teleoperations system and/or evaluating individual teleoperations operators.

In certain embodiments, if a scene is not specifically identified for purposes of teleoperations validation, the scene may be ignored for validation purposes. The scene may still be recorded and maintained, for example, to serve as training data for the autonomy system of the vehicles and/or a simulation system. If the scene is identified for purposes of teleoperations validation by the scene analyzer 455, the validation scene processor 460 may process the scene to be used for validation purposes. In one aspect, the validation scene processor 460 may process the scene, including the video stream(s) included in the scene, into the appropriate format for validation of the teleoperations system. For instance, the validation scene processor 460 may determine an appropriate temporal length for a validation scene and process the scene (e.g., trim a long scene or stitch a short scene with an adjacent scene) to obtain a validation scene of the appropriate temporal length for validation of the teleoperations system. In some implementations, the validation scene processor 460 may include image or video processing pipelines to reformat or modify the video stream(s) included in the scene. For instance, the validation scene processor 460 may perform functions such as modifying (e.g., increasing or decreasing) the image or video stream resolution of the scene, modifying (e.g., increasing or decreasing) the video frame rate of the scene, or modifying the image or video characteristics such as exposure, contrast, noise, and the like.

In another aspect, the validation scene processor 460 may determine a set of validation requirements for the scene. The validation requirements may correspond to one or more requirements of the validation input of the teleoperations operator. The validation requirements may include a first requirement relating to the type(s) of validation input received (e.g., which input(s) on a console the teleoperations operator activated during the interactive validation scene playback) and a second requirement relating to a time requirement at which the validation input(s) was received. The validation requirements may be programmatically determined based on the scene. In certain implementations, the validation requirements may be determined based at least in part on the scene analyses performed by the scene analyzer 455.

Validation scene storage 465 may be a memory or storage element for maintaining a plurality of scenes for validation. The scenes may be organized, labeled, categorized, or otherwise searchable for quick retrieval when performing an interactive validation scene playback.

According to embodiments, validation server 470 may be configured to retrieve scenes stored in the validation scene storage 465 and communicate with the teleoperations human interface systems 420a and 420b to cause the teleoperations human interface systems 420a and/or 420b to initiate interactive validation scene playback of the retrieved scene. The validation server 470 may be configured to receive validation inputs provided by the teleoperations operators during the interactive validation scene playback. The validation server 470 may be further configured to evaluate the validation inputs to determine whether the validation requirements of the scene are satisfied.

Figure 5A:
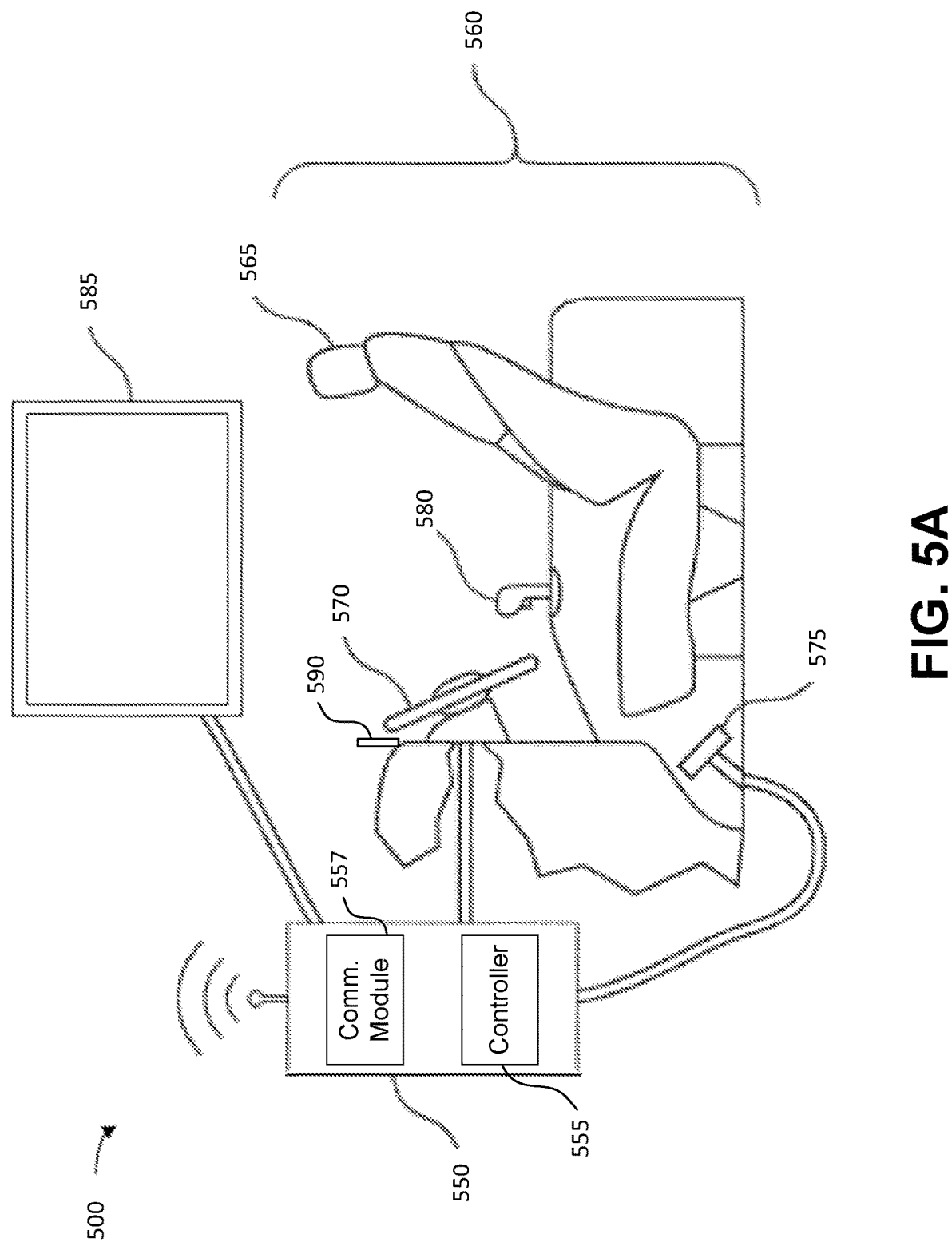
FIG. 5A illustrates a teleoperations human interface system suitable for use in remotely operating a vehicle, e.g., an autonomous vehicle, in accordance with an embodiment.
Figure 5B:
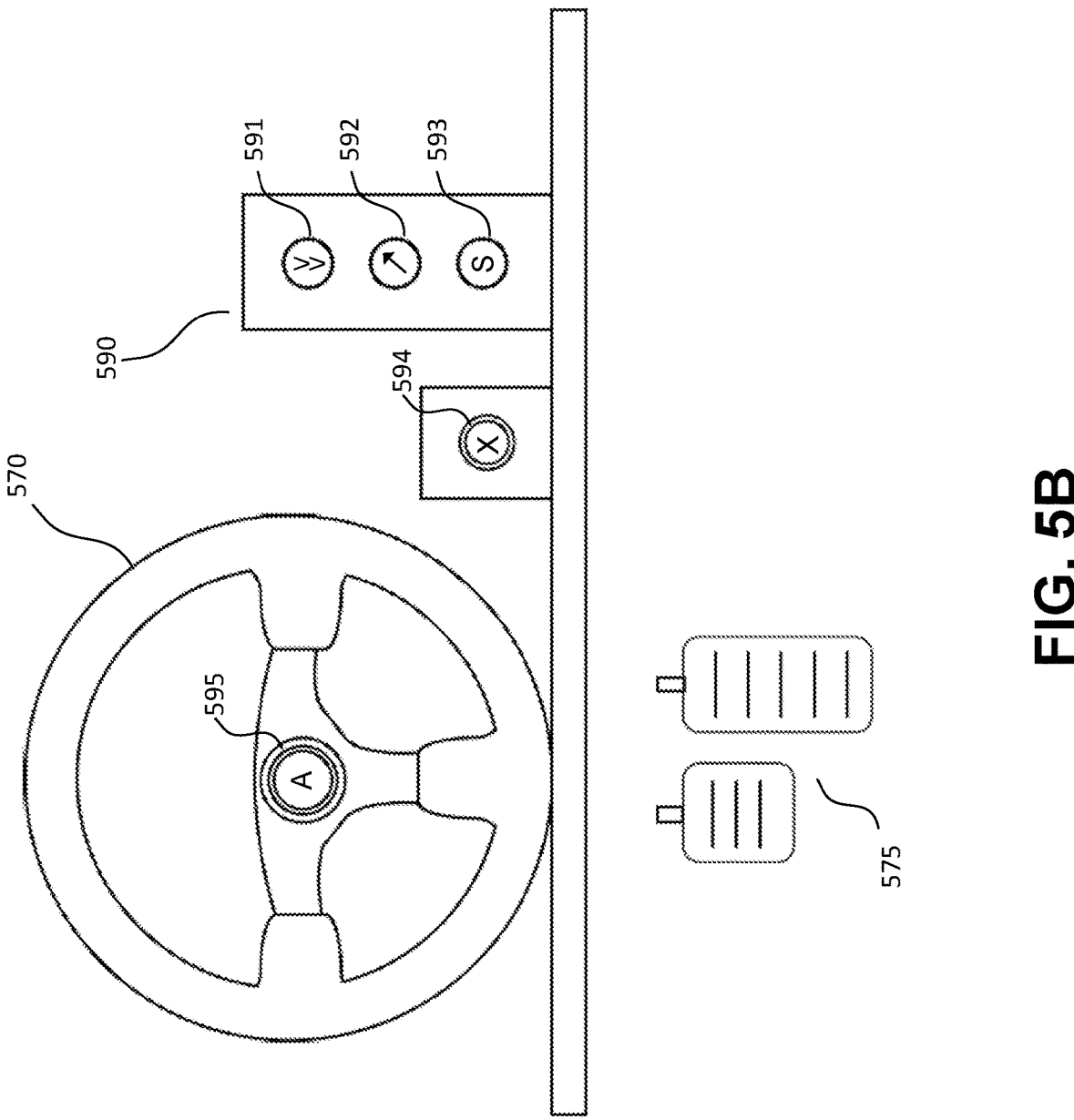
FIG. 5B illustrates in more detail at least a portion of the teleoperations operator station 560, according to an example embodiment.

FIGS. 5A and 5B illustrate a teleoperations human interface system. FIG. 5A illustrates a teleoperations human interface system suitable for use in remotely operating a vehicle, e.g., an autonomous vehicle, in accordance with an embodiment. Teleoperations human interface system 500 may comprise a computing device 550 and a teleoperations operator station 560. FIG. 5B illustrates in more detail at least a portion of the teleoperations operator station 560, according to an example embodiment. FIGS. 5A and 5B are jointly described for ease of description. Referring back to FIG. 4, the teleoperations human interface system 500 of FIGS. 5A and 5B may be an implementation of the teleoperations human interface systems 430-A and 430-B illustrated in and described with respect to FIG. 4.

The teleoperations operator station 560 includes components, which generally resemble a driver station in a typical vehicle. For example, the teleoperations operator station 560 may include a driver seat 565, a steering wheel 570, brake and acceleration pedals 575, and a gear shifter 580. These components may be physically similar to corresponding components of a typical vehicle. For example, the driver seat 565, steering wheel 570, brake and acceleration pedals 575, and gear shifter 580 may have sizes and shapes that are generally in line with sizes and shapes of a driver seat, steering wheel, brake and acceleration pedals, and gear shifter, respectively, of a typical vehicle.

The teleoperations operator station 560 also includes a visual interface 585 configured to allow a teleoperations operator to view the autonomous vehicle and/or an environment in which the autonomous vehicle is operating. In an example embodiment, the visual interface 585 includes a virtual-reality (VR) or augmented-reality (AR) headset. However, the visual interface 585 is not limited to being a VR or AR headset. For example, in an alternative example embodiment, the visual interface 585 may include one or more display screens, such as a light-emitting diode (LED), liquid crystal display (LCD), organic light-emitting diode (OLED) or other type of display now known or hereinafter developed. The visual interface 585 may be configured to display any number of different views of the autonomous vehicle and/or the environment of the autonomous vehicle, e.g., based on sensor data provided by the autonomous vehicle or one or more objects or systems external to the autonomous vehicle, such as another autonomous vehicle in a fleet to which the autonomous vehicle belongs. For example, the visual interface 585 may be configured to display one or more of front views, side views, rear views, etc., of the autonomous vehicle and/or the environment of the autonomous vehicle.

The teleoperations operator station 560 may be configured to have an approximate touch response of an actual driver station in a vehicle. For example, the steering wheel 570 may be configured to have a touch response that is similar to that of power steering in an actual vehicle, and the brake and acceleration pedals 575 may be configured to approximate the resistance of brake and acceleration pedals in an actual vehicle. Thus, the teleoperations operator station 560 may provide a configuration in which a teleoperations operator feels substantially like they would feel if they were actually located in the autonomous vehicle. In an example embodiment, the teleoperations operator station 560 may include additional features, like speakers playing sounds from the autonomous vehicle, to further provide a realistic atmosphere for the teleoperations operator.

In an example embodiment, the teleoperations operator station 560 may include one or more inputs 590 configured to be selectively activated by a teleoperations operator to cause the vehicle to perform specific operations. The specific operations may include safety operations such as performing an emergency stop or to decelerate. In certain embodiments, the specific operations may be performed automatically or autonomously by the vehicle once the one of the inputs 590 is activated by the teleoperations operator. For instance, the autonomy system(s) onboard the vehicle may perform a specific operation once one of the inputs 590 is activated by the teleoperations operator. Each of the inputs 590 may include a physical electromechanical input device, such as a button, switch, lever, pedal, or other device. Each of the inputs 590 may be dedicated to a different function.

For example, the inputs 590 can include a "decelerate" input 591, which may be activated (e.g., by pressing) to cause an autonomous vehicle to autonomously decelerate (e.g., to a predefined speed, by a predetermined amount, etc.). The autonomous vehicle may complete the deceleration autonomously without the teleoperations operator needing to provide additional input or otherwise assuming remote control over the vehicle. Alternatively, the "deceleration" input 591 may trigger a deceleration to be completed through teleoperations or another remote control mechanism.

In addition, or in the alternative, the inputs 590 may include a "pull over" input 592, which may be activated (e.g., by pressing) to cause an autonomous vehicle to autonomously move to a safe location and decelerate to a stop. The autonomous vehicle may complete the pull over operation autonomously without the teleoperations operator needing to provide additional input or otherwise assuming remote control over the vehicle. Alternatively, the "pull over" input 592 may trigger a pull over operation to be completed through teleoperations or another remote control mechanism.

In addition, or in the alternative, the inputs 590 may include a "stop" input 593, which may be activated (e.g., by pressing) to cause an autonomous vehicle to decelerate to a stop. The autonomous vehicle may complete the deceleration autonomously without the teleoperations operator needing to provide additional input or otherwise assuming remote control over the vehicle. Alternatively, the "stop" input 593 may trigger a stop to be completed through teleoperations or another remote control mechanism.

In addition, or in the alternative, the inputs 590 may include an "emergency stop" input 594, which may be activated (e.g., by pressing) to cause an autonomous vehicle to decelerate to a substantially immediate stop. In one embodiment, the emergency stop may be completed more rapidly than a regular stop, such as a stop performed in connection with the "stop" input 593. The "emergency stop" input 594 may be activated by the teleoperations operator to avoid an imminent collision. The autonomous vehicle may complete the emergency stop operation autonomously without the teleoperations operator needing to provide additional input or otherwise assuming remote control over the vehicle. Alternatively, the "emergency stop" input 594 may trigger a stop to be completed through teleoperations or another remote control mechanism.

In an example embodiment, when one of the inputs 591-594 is activated to cause an operation to be performed by the autonomous vehicle, the controller 555 or one or more other components of the teleoperations system 400 or another subsystem of a fleet management system can monitor/supervise the autonomous vehicle as it completes the action. For example, the teleoperations system 400 may be on "standby" during the action, poised to seize control of the autonomous vehicle if needed.

In an example embodiment, the inputs 590 may further include an "autonomy" input 595, which may be activated (e.g., by pressing) to cease teleoperations control of the vehicle and change (e.g., return) the autonomous vehicle to an autonomous or fully autonomous state. For example, if an autonomous vehicle is being controlled via teleoperations, the input 595 may be activated to cease that control and cause the autonomous vehicle to operate autonomously.

In an example embodiment, the brake and acceleration pedals 575 are configured to provide braking and acceleration functionality while the vehicle is being remotely controlled via the teleoperations system 400. The brake and acceleration pedals may operate in a manner that is akin to brake and acceleration pedals in a standard vehicle. The brake and acceleration pedals 575 may be further configured such that, when one or both of the brake and acceleration pedals 575 are activated during autonomous operations of the autonomous vehicle (e.g., while the vehicle is in an autonomous state), the brake and acceleration pedals 575 transmit one or more signals to the controller 555 to cause the vehicle to enter a teleoperations state (e.g., being remotely controlled via the teleoperations system 430).

As would be recognized by a person of ordinary skill in the art, the example functions, configurations, and arrangements of the inputs 590 (including individual inputs 611-615), the steering wheel 570, and the acceleration and brake pedals 575 depicted in FIGS. 5A and 5B are illustrative and should not be construed as being limiting in any way. For example, the inputs 590 may be rearranged, formed as distinct components of the teleoperations operator station 560 or as integral features of one or more components of the teleoperations operator station 560, or there may be more or less buttons 590 and/or pedals 575, which may perform, more, less, or different functions, in alternative example embodiments. As another example, one or more of the inputs 590 may be provisioned as "software buttons" presented on a touchscreen display such as visual interface 585, and the one or more of the inputs 590 thus provisioned may be activated by a touch input received via the touchscreen display. In addition, the ability to seize control of the autonomous vehicle (e.g., through teleoperations or remote control) may be included in one or more additional buttons or other devices, rather than the brake and acceleration pedals 575, in alternative example embodiments.

Depending on the implementation, the teleoperations operator station 560 may be operatively coupled to a computing device 550. The computing device 550 may a computer, server, or other computing device, which is configured to facilitate communications with, and/or operations involving the autonomous vehicle, fleet management system, the teleoperations server, and/or components of the teleoperations operator station 560. The computing device 550 may include one or more processors, memories, machine instructions, and/or hardware for processing and communicating information. In some implementations, the communications module 557 may be configured to facilitate communications between the teleoperations server 410 and the teleoperations operator station 560 to facilitate teleoperations monitoring and control of vehicles by teleoperations operators. In other implementations, the computing device 550 may operate in lieu of the teleoperations server 410.

In an example embodiment, the computing device 550 includes a communications module 557 and a controller 555. The communications module 557 may configured to transmit and receive signals to and from the teleoperations operator station 560, the teleoperations server, the vehicle, and/or subsystems of the fleet management system. The communications module 557 may communicate using one or more different types of communications technologies such as Wi-Fi, cellular, wired communications, and/or other wired or wireless communication mechanisms now known or hereinafter developed.

The controller 555 may be configured to process signals from the communications module 557 to enable teleoperations control to be provided to the autonomous vehicle. For example, the controller 555 may be configured to process signals from the teleoperations operator station 560 and to translate the signals into control instructions for controlling the autonomous vehicle. In a teleoperations mode, for example, when a human operator turns or steers the steering wheel 570, the controller 555 may generate corresponding control instructions to be sent to the autonomous vehicle (via the communications module 557 and/or the teleoperations server 410) to instruct the autonomous vehicle to turn or drive in a direction corresponding to the turning/steering of the teleoperations operator.

In addition, the controller 555 may be configured to detect activation of one or more of the buttons 590 and to cause a function associated with an activated input 590 to be executed. For example, the controller 555 can cause signals (e.g., instructions or information) to be sent to the autonomous vehicle (via the communications module 557 and/or the teleoperations server 410) to cause the autonomous vehicle to stop, decelerate, pull over, perform an emergency stop, return to an autonomous mode, enter a teleoperations mode, or take another action in response to detecting activation of one of the inputs 590. In an example embodiment, the controller 555 may be further configured to process signals from the autonomous vehicle and/or other fleet management system subsystems to monitor behavior of the autonomous vehicle, e.g., for determining whether a need exists for additional teleoperations operations following the execution of the function associated with the activated input 590 and/or for confirming successful operation of the function associated with the activated input 590.

The computing device 550 may be connected to one or more of the components of the teleoperations operator station 560 by one or more physical cables or other connections. In addition, or in the alternative, the computing device 550 may be wirelessly coupled to one or more of the components of the teleoperations operator station 560 using any suitable mechanism now known or hereinafter developed, such as Bluetooth or Wi-Fi. Each of the components of the teleoperations operator station 560 may be substantially directly connected to the computing device 550 or coupled to the computing device 550 through one or more intermediate devices and/or networks, e.g., wireless and/or cellular networks.

In accordance with embodiments, the teleoperations human interface system 500 (or a teleoperations console) may be further configured (e.g., in a validation or evaluation mode) to perform interactive validation scene playbacks or replays to, for example, validate the performance of the teleoperations system 400 and/or evaluate the performance of individual teleoperations operators. In other words, the teleoperations console may be configurable to operate in a normal mode of operation to perform real-time remote monitoring and/or control of vehicles and may be further configurable to operate in a validation or evaluation mode to present playbacks of driving scenes for an operator. During an interactive validation scene replay, a recorded scene such as one previously recorded during real-world operations of an autonomous vehicle, may be presented by the teleoperations human interface system 500 of FIGS. 5A and 5B. During an interactive validation scene playback, the recorded scene may be presented in a manner that is identical or similar to the presentation of information during normal operation of the teleoperations human interface system (e.g., to monitor the progress of the vehicle while operating autonomously and/or during teleoperations operations to remotely control the vehicle). For instance, one or more recorded video streams may be presented on the visual interface 585 to allow a teleoperations operator to view a replay of the previously recorded scene, including the vehicle and/or the environment of the vehicle in which the vehicle operated. Information such as vehicle speed, vehicle heading, location information (e.g., vehicle GPS coordinates, vehicle location on a moving map), vehicle systems information, contextual data, and other information that are normally presented during a normal teleoperations monitoring and/or control session of the vehicle may be presented to the teleoperations operator during an interactive validation scene playback. In addition, object recognition information may be presented during the interactive validation scene playback. In one implementation, overlays of autonomy system's identification of objects in the scene replay may be presented on the visual interface 585.

During an interactive validation scene playback, the teleoperations operator may provide one or more validation inputs. The validation inputs may be received via one or more of the input mechanisms provided on the teleoperations operator station 560. The teleoperations operator may activate one of the inputs 590 illustrated in FIG. 5B during the interactive validation scene playback. Alternatively, or in addition, the one or more validation inputs may be provided via the steering wheel 570, the accelerator and brake pedals 575, or the gear selector 580. As an example, a validation scene may present a scenario in which a pedestrian or cyclist comes crosses the path of the vehicle. In response, the teleoperations operator may react to the scenario presented in the validation scene by providing validation inputs comprising one or more of: activating one of the inputs 590, turning the steering wheel 570, pressing the accelerator or the brake pedals 575, and/or interacting with the gear selector 580. The one or more validation inputs may be evaluated for the purposes of the validation process based on, for example, the input(s) received (e.g., which of the inputs mechanisms was activated by the teleoperations operator in response to the scenario presented in the validation scene), the time at which the input was received, and the like. In certain embodiments, the received validation input(s) may be evaluated against one or more validation requirements determined for the validation scene.

According to embodiments, the computing device 550 of the teleoperations human interface system 500 may communicate with a teleoperations validation server, such as teleoperations validation server 425 of FIG. 4 to perform an interactive validation scene playback. In particular, the computing device 550 may receive data from the teleoperations validation server 425 to enable the presentation of the validation scene on the teleoperations human station. For instance, the computing device 550 may receive video data of the validation scene to enable the presentation of video feeds on the visual interface 585. In addition, the computing device may receive and/or process data corresponding to inputs provided by the teleoperations operator during the playback. In some embodiments, the computing device 550 is configured to evaluate the validation input(s) (e.g., against one or more validation requirements associated with the scene). In addition, or as an alternative, the evaluation of the validation input(s) may be performed by the teleoperations validation server 425.

Figure 6:
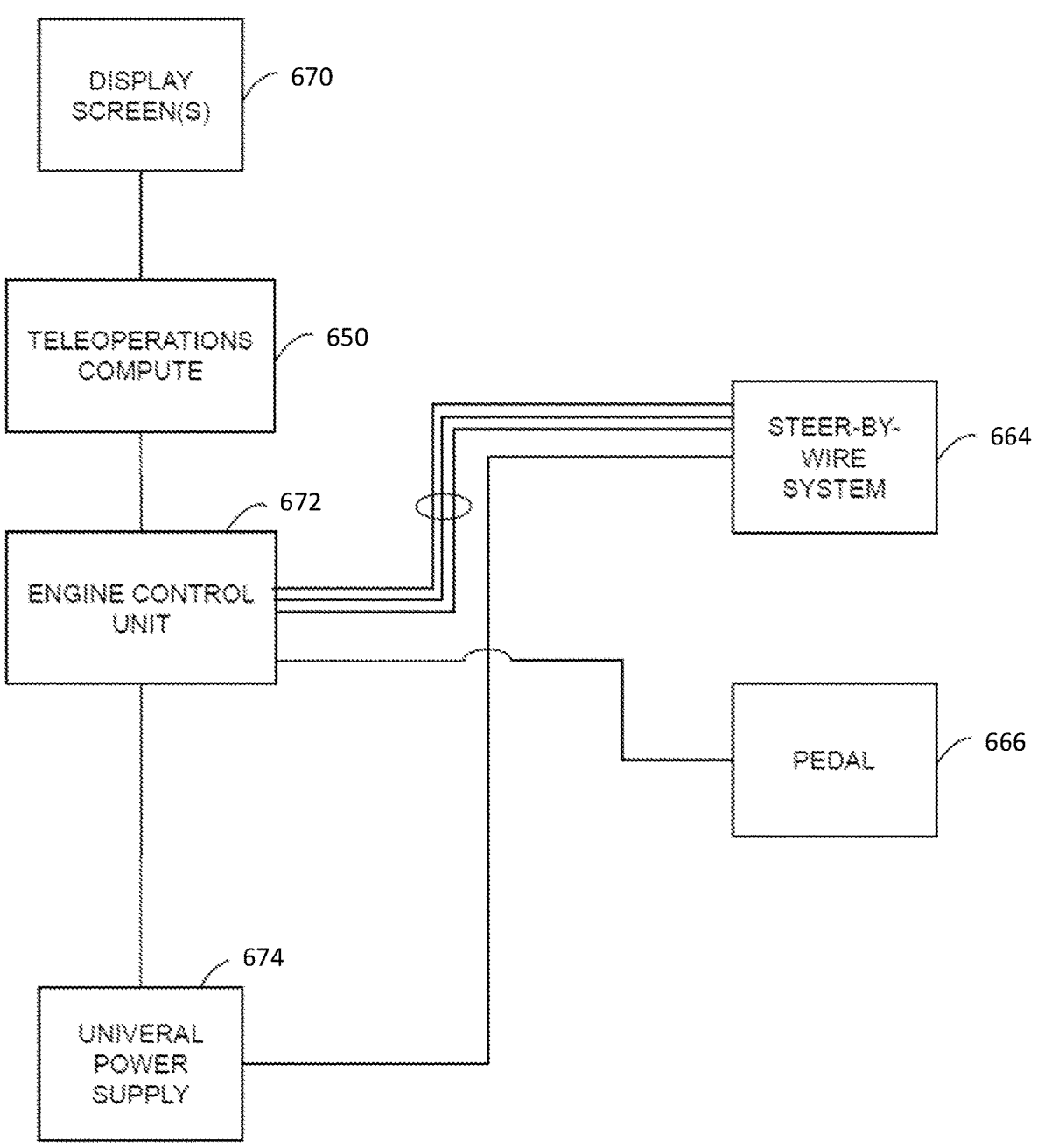
FIG. 6 is a block diagram representation of a teleoperations human interface system, e.g., teleoperations human interface system 500 of FIG. 5A, in accordance with an embodiment.

FIG. 6 is a block diagram representation of a teleoperations human interface system, e.g., teleoperations human interface system 500 of FIG. 5A, in accordance with an embodiment. A teleoperations human interface system 600 that may remotely operate a vehicle includes a visual interface that includes at least one display screen 670, a teleoperations compute 650, an engine control unit 672, a steer-by-wire system 664, at least one pedal 666, and a universal power supply 674.

Display screen 670 may display a view of surroundings of a vehicle that is being operated by or monitored by teleoperations operator. Teleoperations compute 650 provides communication/processing equipment, and may communicate with engine control unit 672 over a CAN bus. Engine control unit 672 takes power from universal power supply 674, and communicates with steer-by-wire system 664 and pedal 666 to facilitate the control of a vehicle. Steer-by-wire system 664 also draws power from universal power supply 674.

An autonomous vehicle that may be operated by a tele-operations system typically includes an onboard teleopera-tions system that communicates with the teleoperations system.

Figure 7:
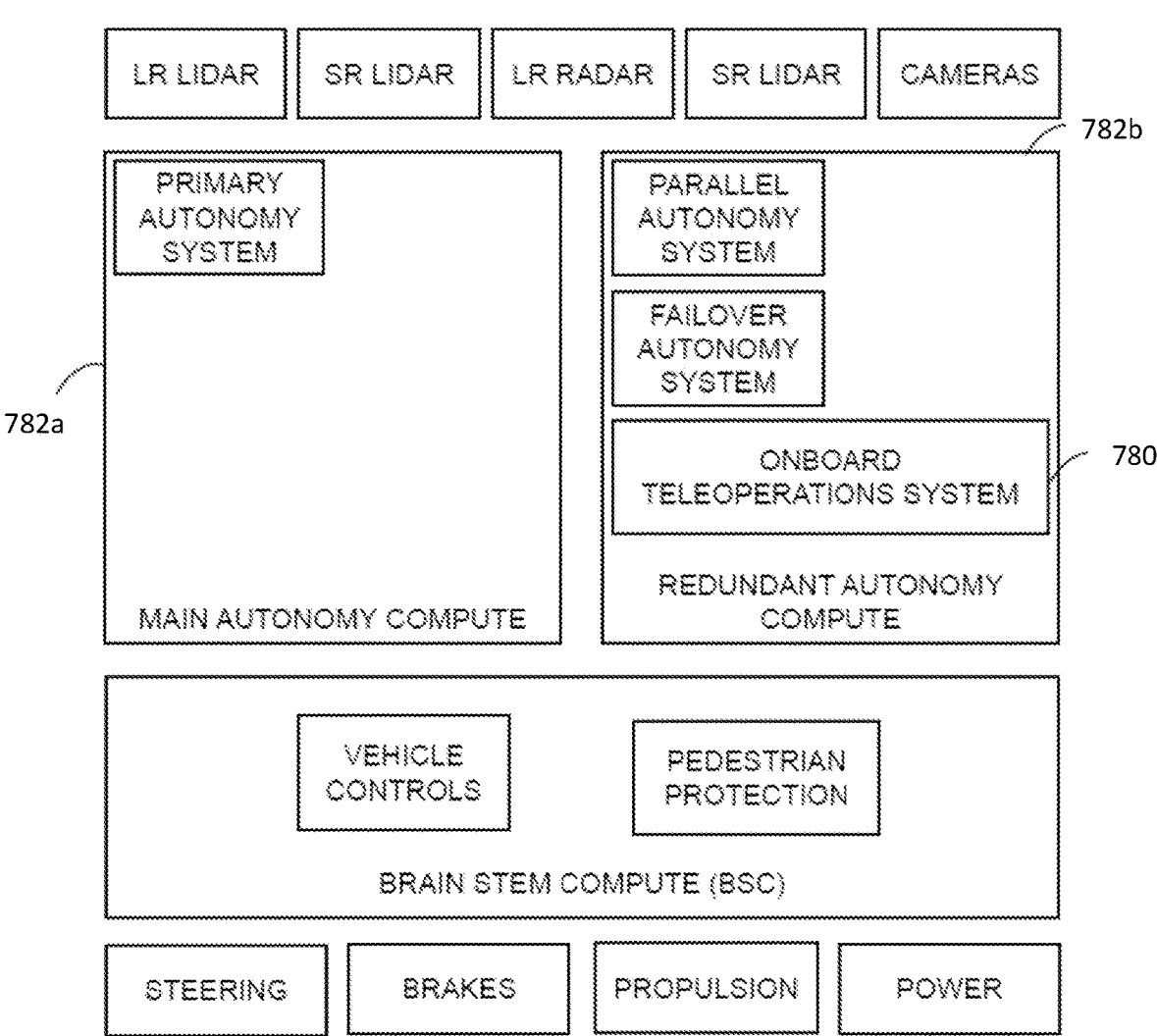
FIG. 7 is a block diagram representation of an autonomous vehicle in accordance with an embodiment of the present invention.

An autonomous vehicle that may be operated by a tele-operations system typically includes an onboard teleopera-tions system that communicates with the remote teleopera-tions operator system. FIG. 7 is a block diagram representation of an autonomous vehicle in accordance with an embodiment of the present invention. An autonomous vehicle 701 includes a main autonomy compute 782*a* that provides vehicle 701 with the ability to operate autono-mously and/or semi-autonomously. Vehicle 701 also includes a redundant autonomy computer 782*b* that is arranged to operate vehicle 701 if main autonomy compute 782*a* may not be used. Redundant autonomy computer 782*b* includes an onboard teleoperation system 780 that cooper-ates with a teleoperation system operated by a remote teleoperations operator, i.e., a teleoperator, such as teleop-eration system 400 of FIG. 4.

Figure 8:
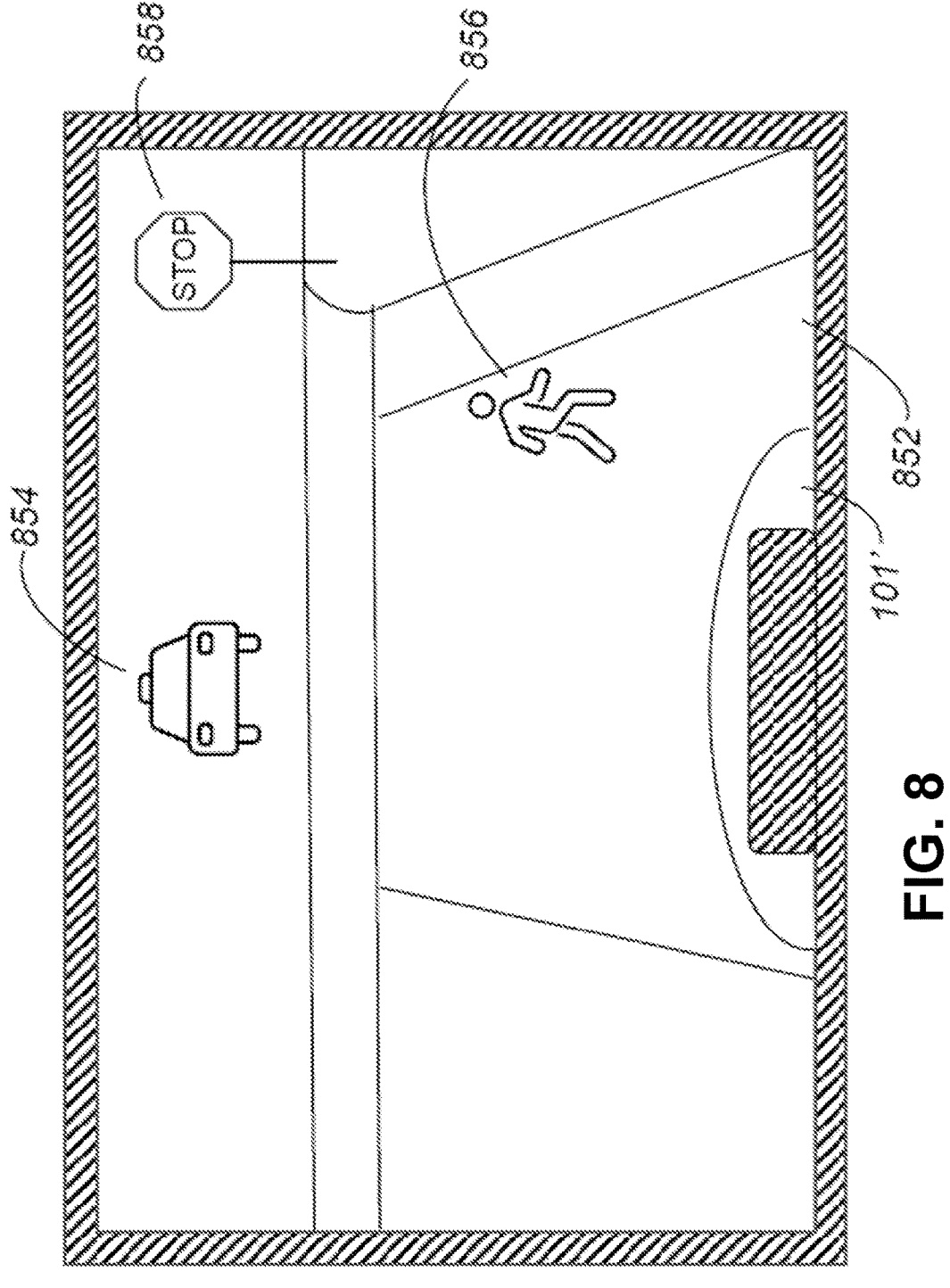
FIG. 8 is a diagrammatic representation of a video feed being displayed on a visual interface during an interactive validation scene playback, in accordance with an embodiment.

FIG. 8 is a diagrammatic representation of a video feed being displayed on a visual interface during an interactive validation scene playback, in accordance with an embodi-ment. A display screen 850, which may be part of a teleop-erations operator console, such as teleoperations operator station 560 of FIG. 5A, may be used to present an interactive validation scene playback of a scene recorded by a vehicle such as autonomous vehicle 101'. The presentation of visual information on the display screen 850 may be used to validate aspects of the teleoperations system and/or evaluate individual teleoperations operators.

Display screen 850 displays a recorded video feed of a front view from the perspective or point-of-view of vehicle 101', although display screen 850 may generally show any suitable view from the perspective of vehicle 101' that was recorded during the scene. The scene depicted on display screen 850 includes a road 852 on which vehicle 101' is operating, a second vehicle 854, a pedestrian 856, and a stop sign 858.

Figure 9A:
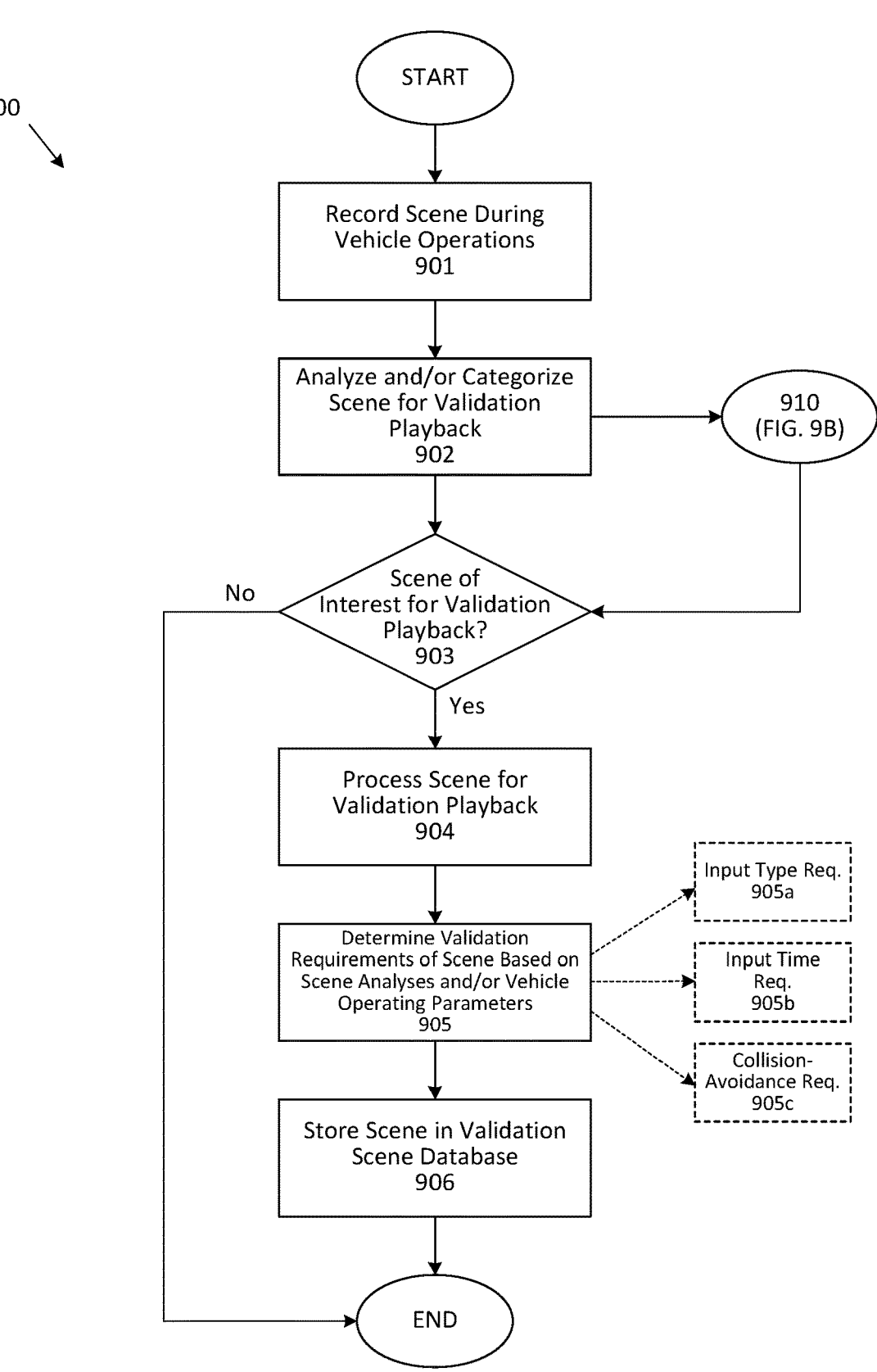
FIG. 9A is a process flow diagram illustrating an example method of recording, identifying, and processing a scene for validation playback, in accordance with an embodiment.

FIG. 9A is a process flow diagram illustrating an example method of recording, identifying, and processing a scene for validation playback, in accordance with an embodiment. The process 900 depicted in FIG. 9A may be performed by one or more autonomous vehicles, a teleoperations server, and/or a teleoperations validation server, such as those illustrated in and described with respect to FIG. 4.

At step 901 of process 900, an autonomous vehicle records a scene during while the vehicle operates. The recording of the scene may be performed during operations of the vehicle to fulfill an autonomous service (e.g., an autonomous vehicle delivery service, an autonomous trans-port service, etc.). The recording of the scene may also be performed during testing, learning, validation, or non-com-mercial operations of the autonomous vehicle. For example, the scene may be recorded as the autonomous vehicle is being operated to collect mapping and sensor data on roads without being tasked to complete any service for any cus-tomer. As another example, the scene may be recorded as the autonomous vehicle is being operated to train its artificial intelligence algorithms in operating in an autonomous man-ner (e.g., learning operations). The recording of the scene may be performed while the vehicle is operating in an autonomous mode, under teleoperations control, or is being driven by a human operator. A plurality of scenes may be recorded by the vehicle as it is being operated. The vehicle may continuously record scenes at it travels along roads and highways. In some embodiments, the scenes may be of a predetermined length temporally. In other embodiments, the temporal duration of a scene may be dynamically adjusted depending on the driving conditions or the environment of the vehicle.

At step 902, the recorded scene is analyzed and/or cat-egorized for validation playback. The scene analyses may be performed by the scene analyzer 455 of FIG. 4. At a high-level, the analyses are geared towards identifying scenes of interest for purposes of validating various aspects the teleoperations system and/or evaluating one or more teleoperations operators. As may be appreciated, a capable autonomous vehicle operating on the roads rarely requires intervention by a teleoperations operator. Since such sce-narios are rare, most of the scenes recorded by the vehicle may not be relevant for purposes of validating the teleop-erations system.

In one embodiment, a scene may be identified for inter-active validation scene playback based on whether, during the scene, the vehicle experiences a scenario in which the teleoperations operator had to intervene to issue a command to the vehicle to perform safety operations (e.g., by inter-acting with inputs 590 illustrated in FIGS. 5A and 5B, such as "emergency stop" input 594) or to take over control of the vehicle via teleoperations (e.g., taking control of the vehicle using the steering wheel 570 and the pedals 575). In addi-tion, or as an alternative, scenes may be identified for interactive validation scene playback based on whether, during the scene, the vehicle's autonomy systems experi-enced a fault. As discussed in additional detail in FIG. 9B, additional factors or parameters may be used to determine whether a scene is identified for validation playback. Based on the scene analyses, the scene may also be categorized or labeled for validation playback. For instance, a scene may be categorized or labeled based on one or more of: a scenario, an object, a driving maneuver, etc. represented in the scene (as recognized by the scene analyses) such that the scene may be quickly and easily retrieved for validation. As one example, scene analyses may recognize that pedestrians are represented in the scene. In response, the scene may be labeled accordingly such that the scene may be retrieved for use during validations to evaluate the performance of tele-operations operators in monitoring and/or controlling vehicles when vehicles are operating in the presence of pedestrians.

At step 903, if the scene is determined to be not of interest for validation playback, the process 900 ends and the scene is not marked or stored for using in future validation playback. The scene may still be used for purposes other than validation of the teleoperations system, such as for training and improving the autonomy system of the vehicle. In some embodiments, a scene not specifically identified as of interest for validation may still be retrieved and used during a validation or evaluation process (e.g., as control or placebo scenes for evaluating a teleoperations operator). If the scene is determined to be of interest for validation playback, the process 900 may continue to step 904.

At step 904, the scene is processed for validation play-back. The scene processing of step 904 may be performed by the validation scene processor 460 of FIG. 4. In one aspect, one or more video streams of the scene may be modified to facilitate interactive validation scene playback. For instance, the resolution, frame rate, exposure, contrast, noise, and the like of one or more of the video streams may be modified for interactive validation scene playback. In addition, the length of the scene may be adjusted.

At step 905, one or more validation requirements for the scene may be determined. Referring back again to FIG. 4, the validation requirements may be determined by, for instance, the validation scene processor 460. The one or more validation requirements may specify requirement(s) for the validation input of the teleoperations operator during the interactive scene playback. According to embodiments, the validation requirements may be determined based on the scene analyses (e.g., an object or agent recognized in the scene, a scenario recognized in the scene), vehicle operating parameters (e.g., vehicle speed, vehicle heading) during the scene, and/or a combination thereof.

According to embodiments, the validation requirements may comprise an input type requirement 905a. The input type requirement 905a may represent which input(s) or control(s) of a teleoperations console, such as teleoperations operator station 560 of FIG. 5A, is expected to be activated by the teleoperations operator during an interactive validation scene playback of the scene. The input type requirement 905a may be programmatically determined based on analyzing the scene, such as based on the scene analyses performed at step 902. The input type requirement 905a may be determined based on one or more of: an object or agent (e.g., another vehicle, a pedestrian, a cyclist, etc.) identified in the scene, a scenario (e.g., a driving or weather condition) identified in the scene, computed parameters relating to a possible or impending collision with one or more objects or agents identified in the scene (e.g., time to collision, distance to collision, etc.), a driving maneuver being performed by the vehicle in the scene (e.g., unprotected left turn, etc.), vehicle operating parameters (e.g., vehicle speed), and the like.

As an example, based on scene analyses determining that the scene depicts inclement weather, the input type parameter 905a may be determined to be a "pull over" teleoperations input, such as input 592 of FIG. 5B, on the teleoperations console. The input type requirement 905a may correspond to, or be satisfied by, a plurality of validation input types. For example, based on scene analyses determining that the scene depicts road construction, the input type parameter 905a may be determined to be any one (or more than one) of a plurality of expected validation inputs including, for example, the "pull over" teleoperations input, a "stop" teleoperations input (e.g., input 593 of FIG. 5B), or the brake pedal 575. As another example, based on the scene analyses determining that the scene depicts the vehicle attempting to perform an unprotected left turn, the teleoperations operator may be expected to activate any of the controls or inputs to put the vehicle into teleoperations control mode (e.g., such that the unprotected left turn may be made by via teleoperations, rather than by the vehicle autonomously). As may be appreciated, the determination of the input type parameter 905a may be optional such as in implementations where the teleoperations operators activate only one control or input (e.g., a "stop" teleoperations input, an "emergency stop" teleoperations input, etc.) during the interactive validation scene playback.

According to embodiments, the validation requirements may comprise an input time requirement 905b. The input time requirement 905b may represent the time at which (or a time window during which) the validation input is expected from the teleoperations operator during the interactive validation scene playback of the scene. The input time requirement 905b may be defined as a time (or a time window) that is relative to start of the scene (e.g., the validation input needs to be activated by the teleoperations operator within a window of 35 to 40 seconds after the start time of the scene). In addition, or as an alternative, the input time requirement 905b may be defined as a time (or a time window) that is relative to one or more of: a scenario being depicted in the scene, an event occurring in the scene (e.g., an object or agent appearing in the scene, an object reaching within a certain distance or time of impact of the vehicle, etc.), and the like. The time input requirement 905b may be programmatically determined based on the scene analyses.

According to embodiments, the validation requirements may comprise a collision-avoidance requirement 905c. The collision-avoidance requirement 905c may represent a requirement (e.g., in terms of distance or time) in avoiding a potential collision or impact with an object or agent, an obstacle, or an environmental feature in the scene. For instance, the collision-avoidance requirement 905c may specify that to pass validation of the scene, validation input of the teleoperations operator must be received in time (e.g., based on the speed of the vehicle in the scene, the minimum braking distance of the vehicle at that particular speed, etc.) to enable the vehicle to come to a stop at least a predetermined distance from an object depicted in the scene. The collision-avoidance requirement 905c may also be determined or defined for a boundary, area, or line within the scene, such as lane marker, a stop sign line, and the like. Multiple collision-avoidance requirements 905c (e.g., one for each object or agent within a predetermined distance of the vehicle) may be determined. Furthermore, the collision-avoidance requirement 905c may be dynamically determined based on a determined category or type of object or agent identified in the scene. For instance, a more aggressive collision-avoidance requirement 905c (e.g., longer distance to collision) may be determined for a pedestrian or a cyclist than for a road curb or a trash receptacle.

As may be appreciated, other validation requirements may be determined and/or defined for the scene based, for instance, on the particular scenario depicted in the scene. For instance, a specific set of actions may be expected to be performed by the teleoperations operator in response to a specific scenario and the validation requirements may be determined and/or defined to include the performance of that specific set of actions during the interactive validation scene playback.

At step 906, the scene may be stored in a validation scene database. The scene may be stored in a manner to enable search and retrieval at a time when the teleoperations validation system is to identify scenes for interactive validation scene playback. For instance, the scene may be stored in a manner to enable the scene to be identified, searches, and/or retrieved on the basis of the results of the scene analyses (e.g., based on the category(s) or label(s) associated with the scene).

Figure 9B:
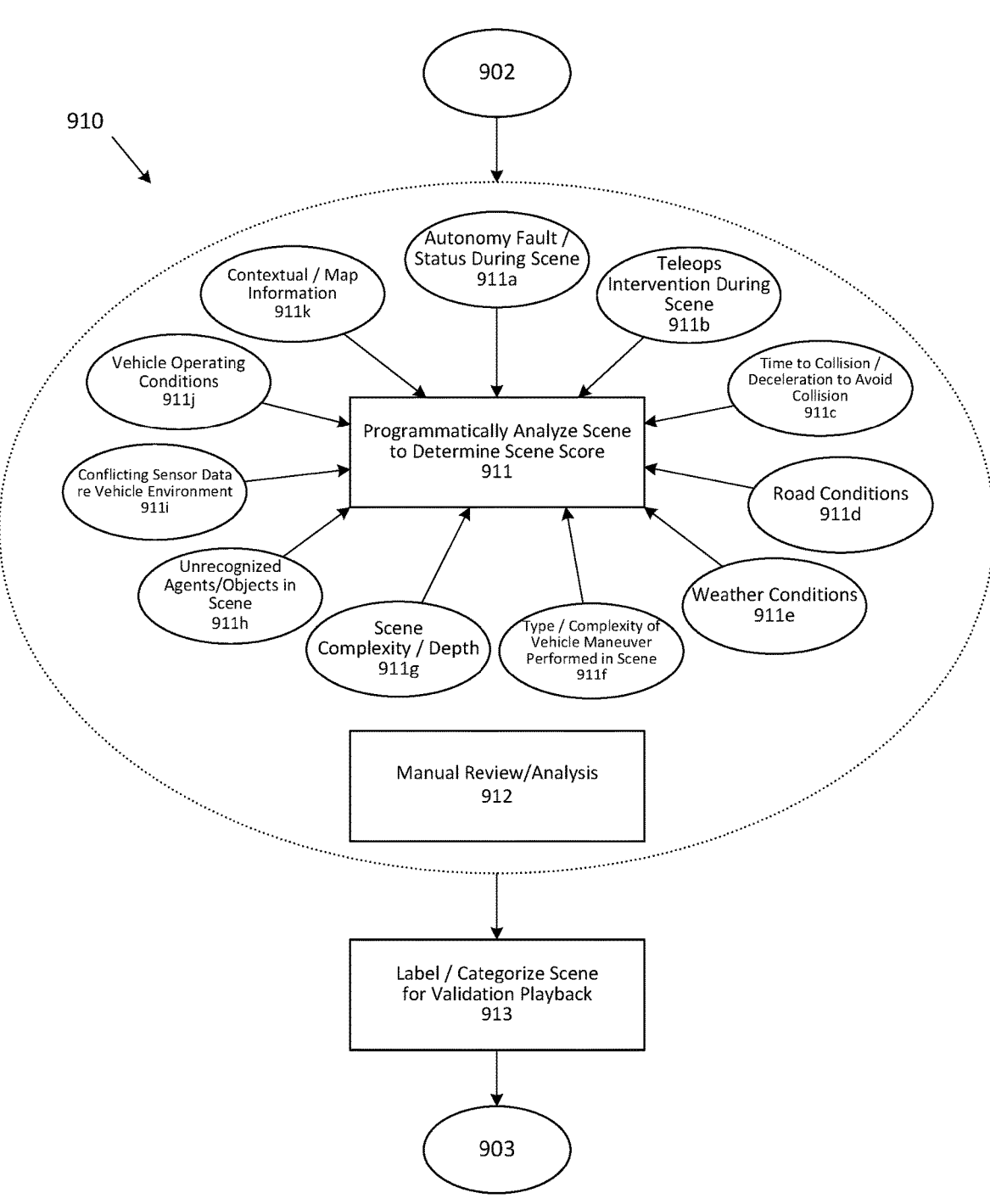
FIG. 9B is a process flow diagram illustrating an example method of determining whether a recorded scene is of interest for validation playback, in accordance with an embodiment.

FIG. 9B is a process flow diagram illustrating an example method of determining whether a recorded scene is of interest for validation playback, in accordance with an embodiment. The process 910 illustrated in FIG. 9B may be performed as part of the process 900 (e.g., step 902) illustrated in FIG. 9A to analyze a scene to determine whether to identify the scene for interactive validation scene playback. Furthermore, the process illustrated in FIG. 9B may be performed a scene analyzer (e.g., scene analyzer 455 of FIG. 4) that analyzes scenes recorded by a teleoperations system.

At step 911, the scene analyzer may programmatically analyze a scene recorded by a vehicle (or by a computing system in communication with the vehicle) to determine a scene score for the scene. As referred to herein, the scene score determined for a scene may be used as a measure of suitability of the scene for purposes of validating the teleoperations system. A number of inputs, parameters, and factors relating to the scene may be used to determine or compute the scene score including, but not limited to including, the status of the vehicle autonomy system (e.g., whether an autonomy fault was experienced, health of the autonomy system, etc.) during the scene 911*a*, a teleoperations intervention received during the scene 911*b*, a time to collision and/or a deceleration required to avoid collision 911*c*, road conditions in the scene 911*d*, weather conditions in the scene 911*e*, type and/or complexity of vehicle maneuver performed in the scene 911*f*, a measure of scene complexity and/or depth 911*g*, number of unrecognized agents or objects in the scene 911*h*, whether one or more sets of sensor data collected by the vehicle lead to conflicting assessments about the vehicle's environment 911*i*, the vehicle's operating conditions 911*j*, and contextual or map information 911*k*. The scene analyzer may assign a corresponding weight to each of the inputs, parameters, or factors in determining the scene score. The scene analyzer may include a machine learning engine to adjust the weighting of a particular input used in determining the scene score based on prior scene score determinations (e.g., using supervised machine learning). In some cases, a particular factor may be determinative in the identification of a scene for validation playback irrespective of other factors or the scene score.

With respect to 911*a*, the scene analyzer may determine a status or health of the autonomy system of the vehicle during the scene. In more detail, a status or health of the autonomy system of the vehicle, while the vehicle is operating in an autonomous mode, may be used as an input in determining the scene score. For instance, the autonomy system of the vehicle may be able to self-evaluate to determine its health and operating conditions and a scene in which the autonomy system of the vehicle is in a low health state (e.g., indicating detection of a software and/or hardware issue) or a fault state may be more likely to be identified for validation playback.

With respect to 911*b*, the scene analyzer may retrieve scene data, logs, and/or other data to determine whether teleoperations was activated during the scene. For example, the scene analyzer may determine whether a teleoperations operator took control of the vehicle during the scene via teleoperations and/or transmitted teleoperations commands to the vehicle (e.g., to perform an emergency stop or to perform a pull over maneuver) during the scene. In some embodiments, a scene in which teleoperations intervention was provided may be more likely to be identified for validation playback.

With respect to 911*c*, the scene analyzer may identify one or more objects or agents in the scene and compute or determine parameters relating to a potential collision with the vehicle. The parameters may comprise a time to collision, a distance to collision, etc., A time to collision parameter may be determined based on the speed of the vehicle during the scene and a computed distance from the agent or object identified in the scene (e.g., computed based on LiDAR or radar data and/or based on image analysis). In one embodiment, if a time or distance to collision parameter is below a threshold value (e.g., less than 3 seconds to collision), the scene may be more likely to be identified for validation playback.

One or more aspects of the analyses to evaluate the scene at step 911 may be performed at the time of the scene. For instance, the health of the autonomy system 911*a* may be evaluated in real-time by the autonomy system of the vehicle during the scene. As another example, the autonomy system of the vehicle may be able to evaluate a time to collision or a deceleration needed to avoid collision 911*c*, road conditions 911*d*, weather conditions 911*e*, and the like in real time during the scene. In addition, programmatic analyses may be performed by the scene analyzer.

At step 912, the scene may undergo manual review and/or analysis. For instance, a system administrator or scene analyst may review the scene. The administrator may review the scene, such as the video feed and any overlays, on a display and manually adjust the scene score and/or categorize the scene. At step 913, the scene may be labeled or categorized for validation playback based on the scene score. The scene may also be labeled or categorized based on the scenario(s), objects, or agents identified in the scene during scene analyses.

Figure 10:
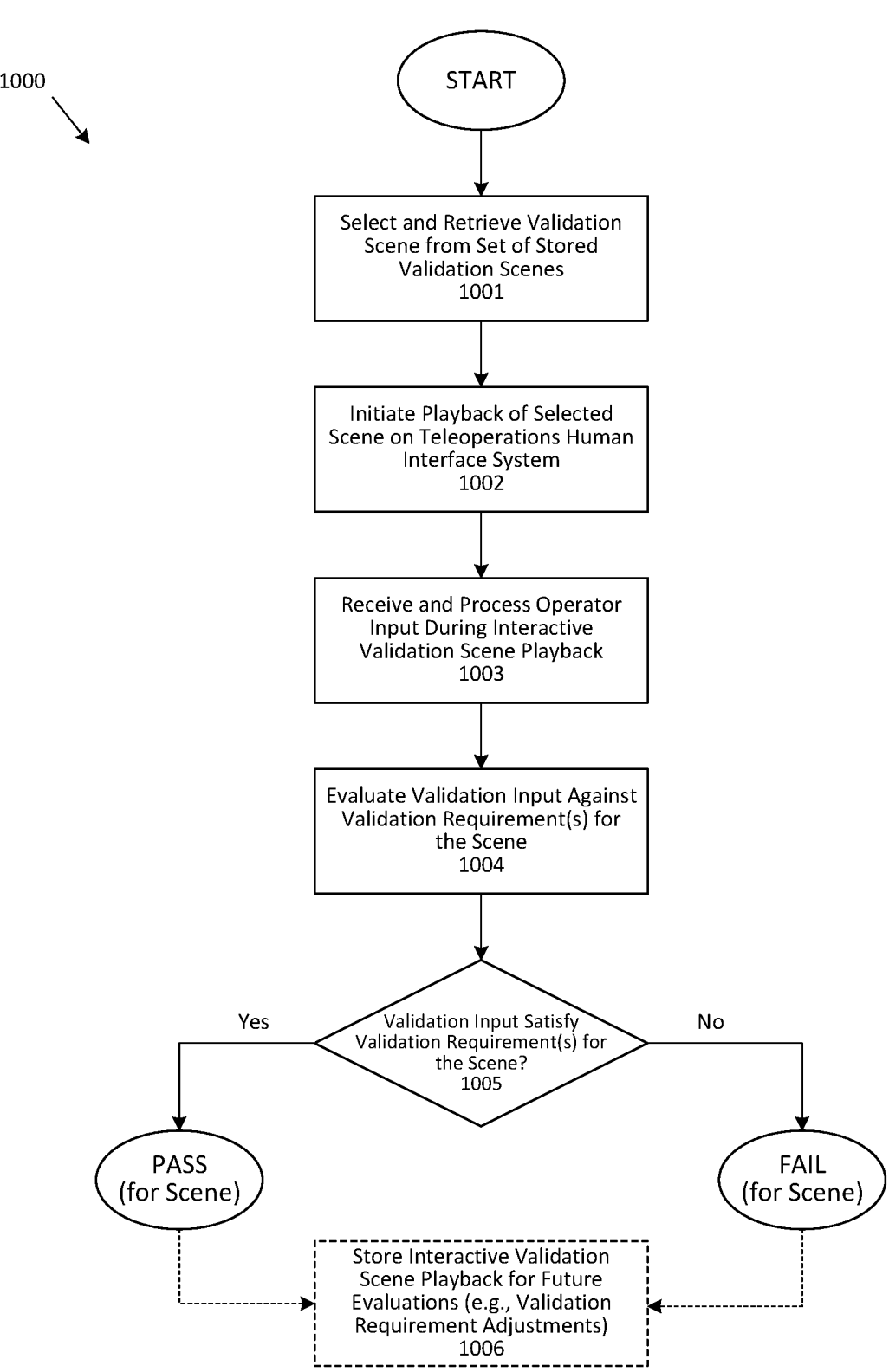
FIG. 10 is a process flow diagram illustrating an example method of performing an interactive validation scene playback as part of performing a validation of a teleoperations system for an autonomous vehicle, in accordance with an embodiment.

FIG. 10 is a process flow diagram illustrating an example method of performing an interactive validation scene playback as part of performing a validation of a teleoperations system for an autonomous vehicle, in accordance with an embodiment. Referring to prior figures, the method 1000 illustrated in FIG. 10 may be performed by one or more elements illustrated in, for example, FIG. 4. For instance, the validation playback of a recorded scene may be performed by a teleoperations validation system (e.g., validation server 425 of FIG. 4) and one or more teleoperations human interfaces (e.g., teleoperations human interfaces 430*a* and 430*b* of FIG. 4).

The process 1000 illustrated in FIG. 10 represents a single instance of an interactive validation scene playback. The process 1000 may be performed as part of an evaluation process of a teleoperations operator (e.g., as part of a training, evaluation, and/or certification process to verify that the teleoperations operator meets certain requirements in operating the vehicle via the teleoperation system). As may be appreciated, the evaluation process of a teleoperations operator may include performing a number of interactive validation scene playbacks (and optionally, a number of other simulation or real-world operating evaluations) for the operator to evaluate that operator. The process 1000 may also be performed as part of a validation process of the teleoperations system to verify that teleoperations system as a whole (e.g., the human-machine combination of teleoperations operators operating the teleoperation system) meets certain objective requirements. As may also be appreciated, the validation process of teleoperations as a whole may comprise performing a number of interactive validation scene playbacks for the population (or a subset of the population) of teleoperations operators. For instance, a validation of teleoperations as a whole may be achieved by performing an evaluation of each of the population of teleoperations operators.

The process 1000 starts at step 1001 where the validation server selects a validation scene from a set of stored validation scenes. At a high level, the validation scene may be selected depending on the needs or requirements of the evaluation or validation process. Depending on the particular validation process, the validation scene may be selected randomly, based on one or more specific scenarios depicted in the scene (e.g., road construction in the scene, inclement weather in the scene, etc.), based on a score associated with the scene (e.g., scene complexity and/or depth score), or any combination thereof. As an example, as part of a validation process to evaluate performance of teleoperations operators in responding to a specific road condition (e.g., road construction), the validation server may select and retrieve a validation scene that depicts the specific road condition (optionally in addition to other selection criteria such as a scene complexity score). Furthermore, as part of a broader evaluation or validation process, the validation server may select a series of validation scenes to satisfy one or more requirements relating to the series of validation scenes as a whole. For instance, within the series of validation scenes for evaluating a teleoperations operator, a certain number of scenes depicting a first scenario (e.g., an inclement weather condition) and a certain number of scenes depicting a second scenario (e.g., a road construction condition) may be selected.

According to embodiments, as part of a validation or evaluation process, recorded scenes that may have been determined to not include scenarios of interest for the validation or evaluation process, such as control scenes, may be selected for interactive validation scene playback. In this manner, the validation or evaluation process may be made to more closely resemble situations encountered by teleoperations operators under real-world operations, where most of the time no teleoperations intervention would be expected of the teleoperations operator.

As part of step 1001, various sets of data and information may be retrieved from the validation datastore. For example, one or more video streams of the validation scene may be retrieved. Validation requirements determined for the validation scene may also be retrieved. Furthermore, other vehicle and contextual data recorded as part of the scene may be retrieved to enable the display of the validation scene playback.

At step 1002, the validation server causes a teleoperations human interface system to initiate interactive validation scene playback of the selected scene. The validation server may transmit video and other data to cause the scene to be presented on a visual interface of the teleoperations human interface system. As an example, the teleoperations human interface system may display a front-view video feed similar to the one illustrated in FIG. 8.

At step 1003, the validation server receives and processes one or more validation inputs during the interactive validation scene playback. The validation inputs may be received via inputs and controls arranged on the teleoperations human interface system such as a steering wheel, acceleration and brake pedals, one or more inputs to cause the vehicle to autonomously perform specified functions (e.g., perform an emergency stop, perform a pull-over maneuver, etc.). As may be appreciated, a validation input may not be received at this step 1003 and the interactive validation scene playback may be evaluated based on the lack of a validation input provided by the teleoperations operator. In playbacks of scenes where a validation input is expected, the lack of a validation input may cause the teleoperations validation server to determine that the teleoperations operator failed the particular scene playback. In contrast, in control scenes, where a validation input is not expected, the lack of a validation input may lead to the teleoperations operator being deemed to have succeeded for the specific interactive validation scene playback (and vice versa, if a validation input is received in a control scene, the teleoperations operator may be deemed have failed the interactive validation scene playback).

At step 1004, the received validation input(s) is evaluated against the validation requirements determined for the scene. For instance, the validation input(s) may be evaluated against the input type requirement 905a to determine whether the expected input on the teleoperations operator console was activated by the teleoperations operator during the playback of the scene. The validation input(s) may also be evaluated against the input time requirement 905b to determine whether the validation input(s) were received during an acceptable time window to satisfy the purposes of the validation. In addition, the teleoperations server may also determine whether, based on the received validation input(s), the vehicle's behavior would satisfy collision-avoidance requirements 905c determined for the scene.

At step 1005, if the validation requirements are satisfied by the validation input(s) provided by the teleoperations operator during the interactive scene, the interactive validation scene playback of the scene may be deemed to have passed. On the other hand, if the validation requirements are not satisfied, the interactive validation scene playback of the scene may be deemed to have failed. As part of step 1005, or after step 1005, a cumulative evaluation metric for the teleoperations operator (e.g., a validation pass rate over a plurality of interactive validation scene playbacks performed by that teleoperations operator) or a cumulative, system-wide validation metric for the teleoperations system (e.g., a validation pass rate over a plurality of interactive scene playbacks performed by a population of teleoperation operators) may be updated based on the outcome of the interactive validation scene playback performed during process 1000.

At step 1006, the validation server may store aspects of the interactive validation scene playback, such as the validation input of the teleoperations operator, in a database. This may be performed to enable evaluations of teleoperations validation performance without re-performing the interactive validation scene playback performed during process 1000.

Although only a few embodiments have been described in this disclosure, it should be understood that the disclosure may be embodied in many other specific forms without departing from the spirit or the scope of the present disclosure. An autonomous vehicle has generally been described as a land vehicle, or a vehicle that is arranged to be propelled or conveyed on land. It should be appreciated that in some embodiments, an autonomous vehicle may be configured for water travel, hover travel, and/or air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A method comprising:

retrieving a first driving scene from a storage of a validation system, wherein the first driving scene is a recorded feed that corresponds to a real-world driving scenario previously captured by a first vehicle, the first driving scene being retrieved from the storage by a teleoperations system that includes a teleoperations console and a teleoperations human interface system;

presenting a playback of the first driving scene during a simulation process, the playback of the first driving scene being presented on the teleoperations console to enable the teleoperations console to simulate remotely monitoring the first vehicle using the teleoperations console during the real-world driving scenario previously captured by the first vehicle;

during presentation of the playback of the first driving scene by the teleoperations console during the simulation process, monitoring one or more controls on the teleoperations console using the teleoperations human interface system, wherein the one or more controls on the teleoperations console includes a control to simulate causing the first vehicle being remotely monitored via the teleoperations console to exit an autonomous mode;

determining, based on monitoring the one or more controls on the teleoperations console using the teleoperations human interface system, a first evaluation outcome for an operator for the first driving scene; and based at least in part on the first evaluation outcome for the operator for the first driving scene, certifying the operator for performing teleoperations functions for a fleet of vehicles using the validation system.

2. The method of claim 1, wherein presenting the playback of the first driving scene during the simulation process includes presenting, on the teleoperations console, one or more video streams recorded by the first vehicle during the real-world driving scenario.

3. The method of claim 1, wherein the first driving scene is captured by the first vehicle while the first vehicle is operating in the autonomous mode.

4. The method of claim 3, wherein presenting the playback of the first driving scene during the simulation process includes presenting, on the teleoperations console, information relating to an autonomy system of the first vehicle, the autonomy system configured to operate the first vehicle in the autonomous mode.

5. The method of claim 4, wherein the playback of the first driving scene is presented by the teleoperations console to simulate the operator remotely monitoring the first vehicle using the teleoperations console while the first vehicle is operating in the autonomous mode.

6. The method of claim 1, wherein determining the first evaluation outcome for the operator for the first driving scene includes:

determining that the first driving scene includes an input requirement; and based on monitoring one or more controls on the teleoperations console, determining whether the operator satisfied the input requirement of the first driving scene.

7. The method of claim 1, wherein determining the first evaluation outcome for the operator for the first driving scene includes monitoring one or more controls on the teleoperations console to determine that the operator provides an input via the control to simulate causing the first vehicle to exit the autonomous mode.

8. The method of claim 1, wherein the one or more controls on the teleoperations console includes an input to cause the vehicle being monitored to be remotely monitored via the teleoperations console to simulate performing an emergency stop maneuver.

9. The method of claim 8, wherein determining the first evaluation outcome for the operator for the first driving scene includes monitoring the one or more controls on the teleoperations console to determine that the operator provides an input via the control to simulate causing the first vehicle to simulate performing the emergency stop maneuver.

10. The method of claim 1, further comprising:

validating a teleoperations system for monitoring a fleet of vehicles based at least in part first evaluation outcome for the operator for the first driving scene, wherein the teleoperations system includes a plurality of teleoperations consoles.

11. The method of claim 1, wherein the teleoperations console presenting the playback of the first driving scene during the simulation process is further configurable to perform teleoperations monitoring of a second vehicle during real-world operations of the second vehicle.

12. The method of claim 1, further comprising:

retrieving a second driving scene during the simulation process, wherein the second driving scene is a simulated driving scenario of a virtual vehicle;

presenting the second driving scene on the teleoperations console during the simulation process, the second driving scene being presented on the teleoperations console to simulate remotely controlling the virtual vehicle during the simulated driving scenario;

determining a second evaluation outcome for the second driving scene; and wherein certifying the operator for performing teleoperations functions for a fleet of vehicles is based further on the second evaluation outcome for the operator for the second driving scene.

13. The method of claim 12, further comprising selecting the first driving scene based on the real-world scenario associated with the first driving scene.

14. The method of claim 12, further comprising:

presenting playbacks of other driving scenes to generate evaluation outcomes for the other driving scenes; and wherein validating the teleoperations system is further based on aggregate measures of evaluation outcomes for the other driving scenes.

15. The method of claim 1 further including:

recording the first driving scene during operation of the first vehicle in the real-world driving scenario;

analyzing the first driving scene to determine whether the first driving scene is suitable for the playback during the simulation process; and storing the first driving scene in the storage of the validation system when it is determined that the first driving scene is suitable for the playback during the simulation process.

16. The method of claim 15 wherein analyzing the first driving scene to determine whether the first driving scene is suitable for the playback during the simulation process includes categorizing the first driving scene as being suitable for the playback during the simulation process for a first validation requirement, the method further including:

determining, before retrieving the first scene from the storage of the validation system, that the operator is to be evaluated based on the first validation requirement.

17. A method comprising:

obtaining, from a first vehicle, a set of data captured by the first vehicle during a real-world driving scenario of the first vehicle, wherein the set of data is obtained by a validation system that includes a validation scene processor;

generating a first driving scene based on the set of data captured by the first vehicle during the real-world driving scenario, wherein the first driving scene is generated by the validation scene processor;

presenting playbacks of the first driving scene on a teleoperations system that includes a plurality of teleoperations consoles during a simulation process, each of the playbacks of the first driving scene being presented on each teleoperations console included in the plurality of teleoperations consoles to simulate remotely monitoring the first vehicle driving in the first driving scene based on data captured by the first vehicle during the real-world driving scenario, wherein each of the teleoperations consoles included in the plurality of teleoperations consoles includes a control configured to simulate the first vehicle being remotely monitored via each of the teleoperations consoles exiting an autonomous mode during the simulation process;

generating respective evaluation outcomes for the first driving scene for each of the teleoperations consoles of the plurality of teleoperations consoles; and validating the teleoperations system based at least in part on an aggregate measure of the respective evaluation outcomes for the first driving scene generated for each of the teleoperations consoles of the plurality of teleoperations consoles.

18. The method of claim 17, further comprising:

presenting a second driving scene, wherein the second driving scene is a simulated driving scenario of a virtual vehicle; and validating the teleoperations system based further on an aggregate measure of evaluation outcomes for the second driving scene.

19. A teleoperations system comprising:

one or more processors;

one or more teleoperations consoles including a first teleoperations console, the first teleoperations console including one or more displays configured to present one or more live video feeds from a first vehicle that is remotely monitored via the first teleoperations console;

one or more controls for receiving inputs to generate remote commands to the first vehicle that is remotely monitored by the first teleoperations console, wherein the remote commands cause the first vehicle to take an action; and one or more memory resources storing instructions that, when executed by the one or more processors of the first teleoperations console, cause the first teleoperations console to operate in a validation mode to:

present, on the one or more displays, a playback of a driving scene corresponding to a real-world driving scenario captured by a second vehicle during a simulation process, the playback of the driving scene being presented by the first teleoperations console to simulate monitoring the second vehicle using the first teleoperations console during the real-world driving scenario;

during presentation of the playback of the driving scene by the first teleoperations console during the simulation process, monitor the one or more controls on the first teleoperations console;

wherein the one or more controls on the first teleoperations console includes a control to simulate causing a vehicle being remotely monitored via the teleoperations console to exit an autonomous mode; and determine, based on monitoring the one or more controls on the first teleoperations console, an evaluation outcome for the driving scene.

* * * * *